(12) United States Patent
Nakada

(10) Patent No.: US 7,424,379 B1
(45) Date of Patent: Sep. 9, 2008

(54) ACTIVITY INFORMATION METER

(75) Inventor: Masato Nakada, Hoffman Estates, IL (US)

(73) Assignee: Tanita Corporation, Tokyo (JP)

( * ) Notice: Subject to any disclaimer, the term of this patent is extended or adjusted under 35 U.S.C. 154(b) by 57 days.

(21) Appl. No.: 11/710,921

(22) Filed: Feb. 27, 2007

(51) Int. Cl.
*G01R 25/00* (2006.01)
*G06F 19/00* (2006.01)

(52) U.S. Cl. .................................... 702/65
(58) Field of Classification Search .............. 702/65
See application file for complete search history.

(56) References Cited

U.S. PATENT DOCUMENTS 6,223,018 B1    4/2001    Fukumoto et al.

FOREIGN PATENT DOCUMENTS

| JP | 10-228524 | | 8/1998 |
|---|---|---|---|
| JP | 10-229357 | | 8/1998 |
| JP | 2001-77735 | | 3/2001 |
| JP | 2001-223649 | * | 8/2001 |
| JP | 2003-557 | | 1/2003 |
| JP | 2003-143086 | | 5/2003 |

* cited by examiner

*Primary Examiner*—Michael P. Nghiem
*Assistant Examiner*—Cindy H Khuu
(74) *Attorney, Agent, or Firm*—McDermott Will & Emery LLP

(57) ABSTRACT

An activity information meter is provided which is capable of stable transmission between a measuring device and an output device and is highly convenient. In a measuring device 1 or 101 and an output device 51 or 151, a selector is placed between a current output section and each electrode and between a voltage detection section and at least one electrode and a transmission route is selected as appropriate, thereby making possible bidirectional transmission using a body as a medium, a change in potential is detected based on a reference potential at the time of reception without using the earth as a reference potential or a voltage generated based on a body part impedance is detected without using the earth as a reference potential. As a result, the activity information meter is hardly influenced by the environment.

16 Claims, 28 Drawing Sheets

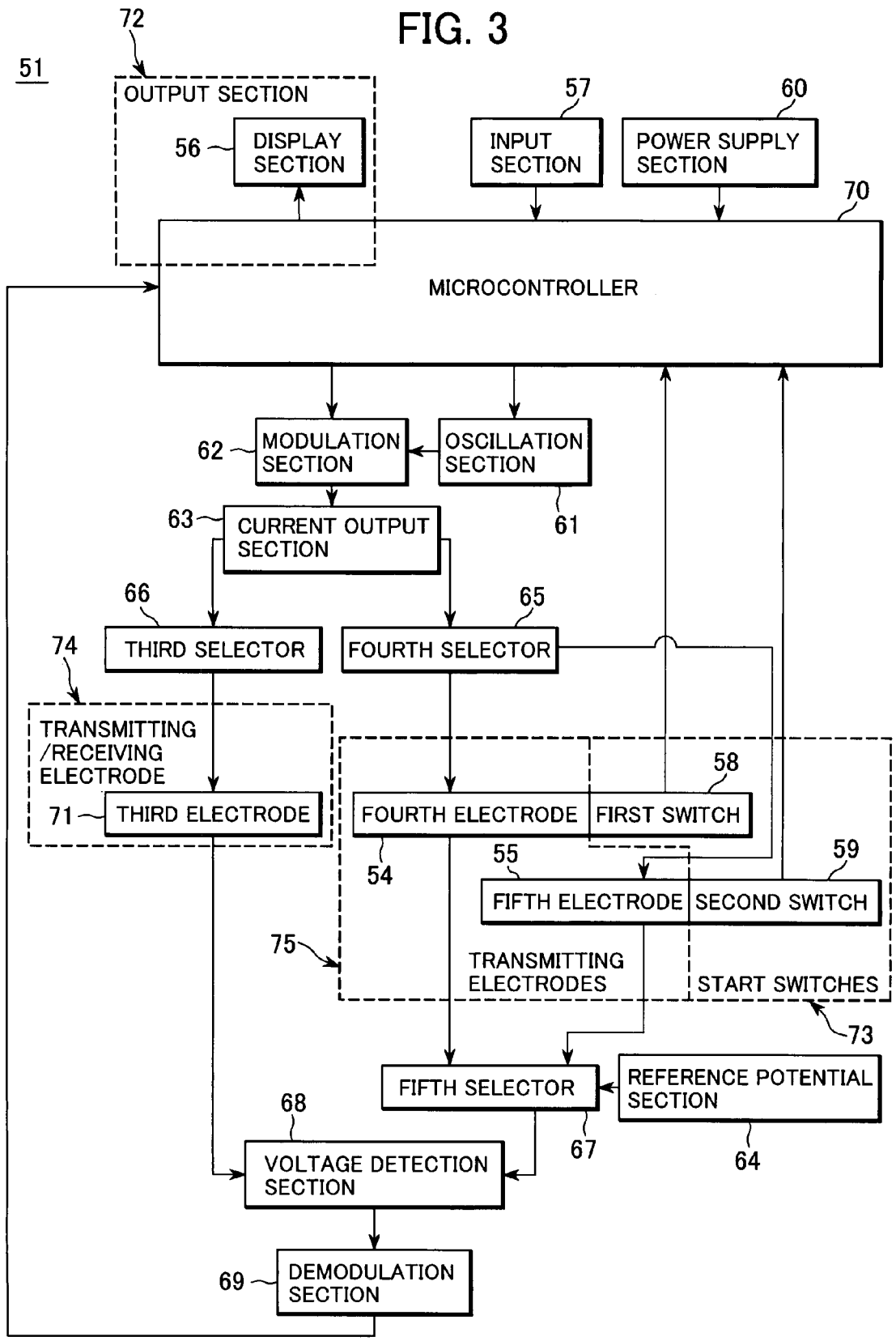

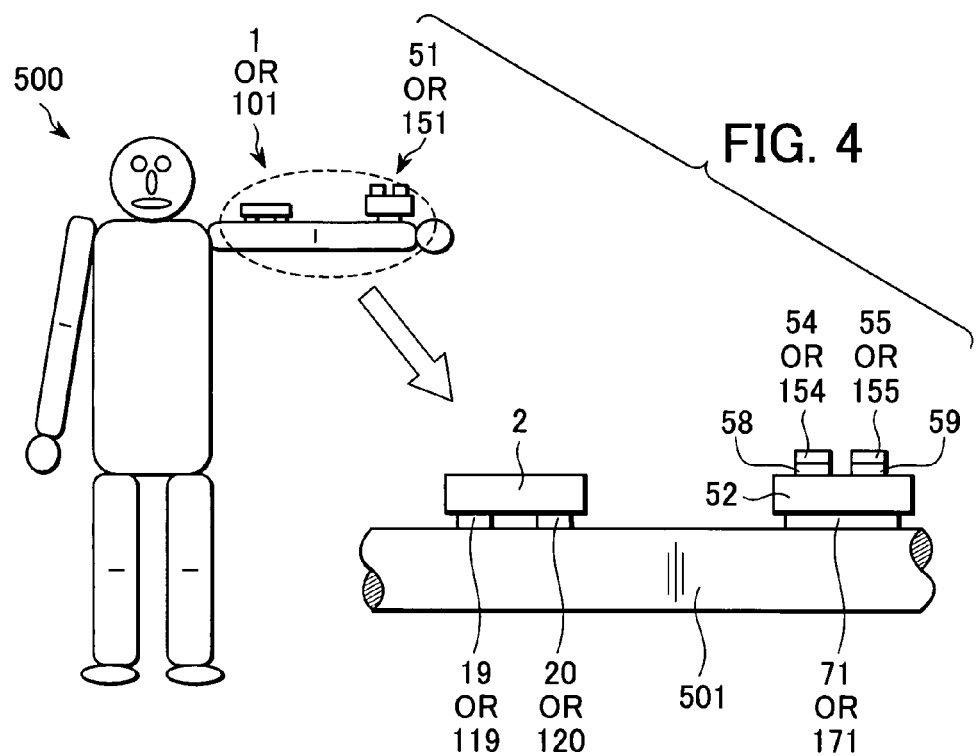
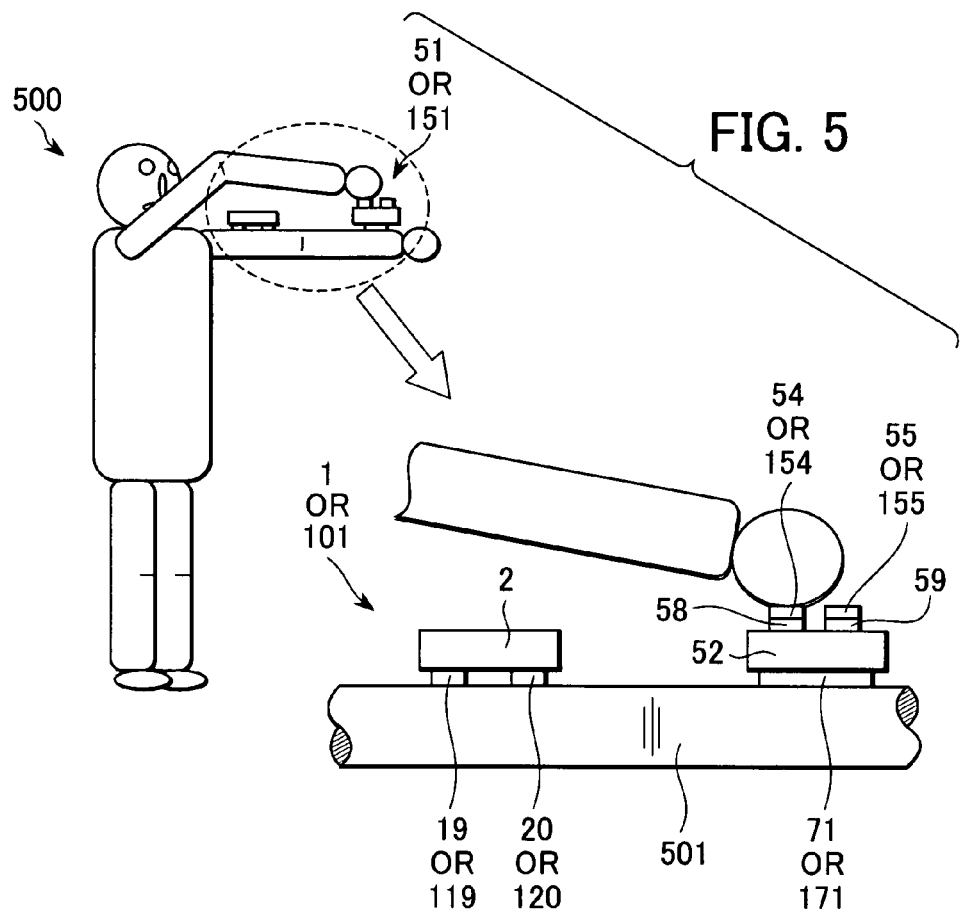

FIG. 6
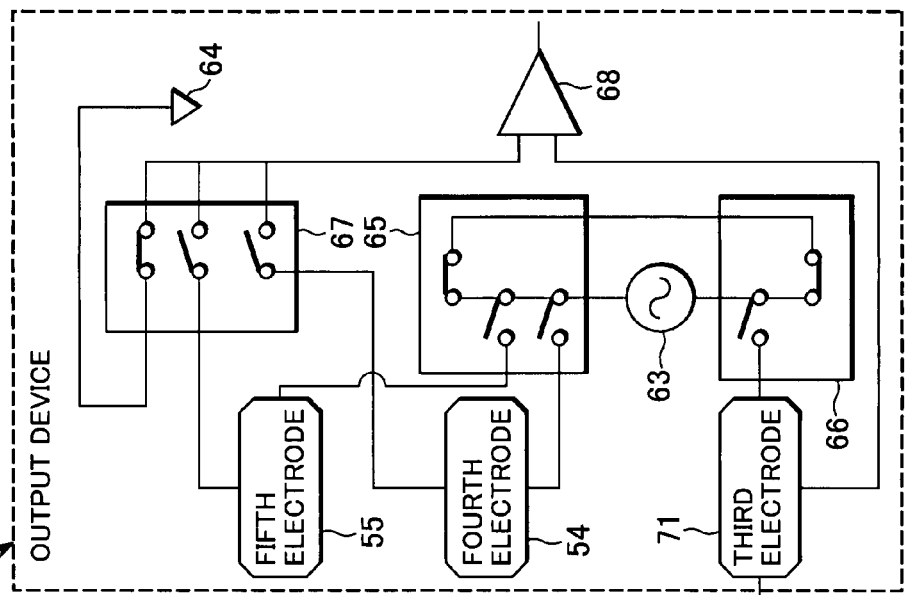
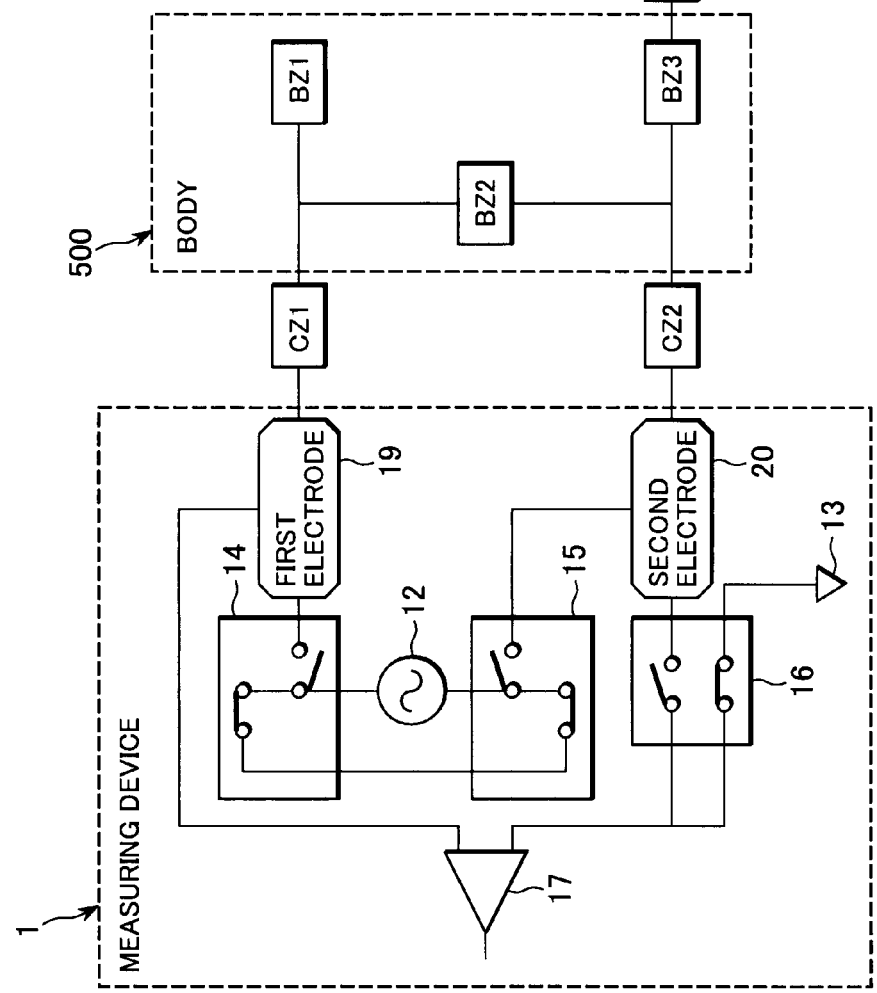

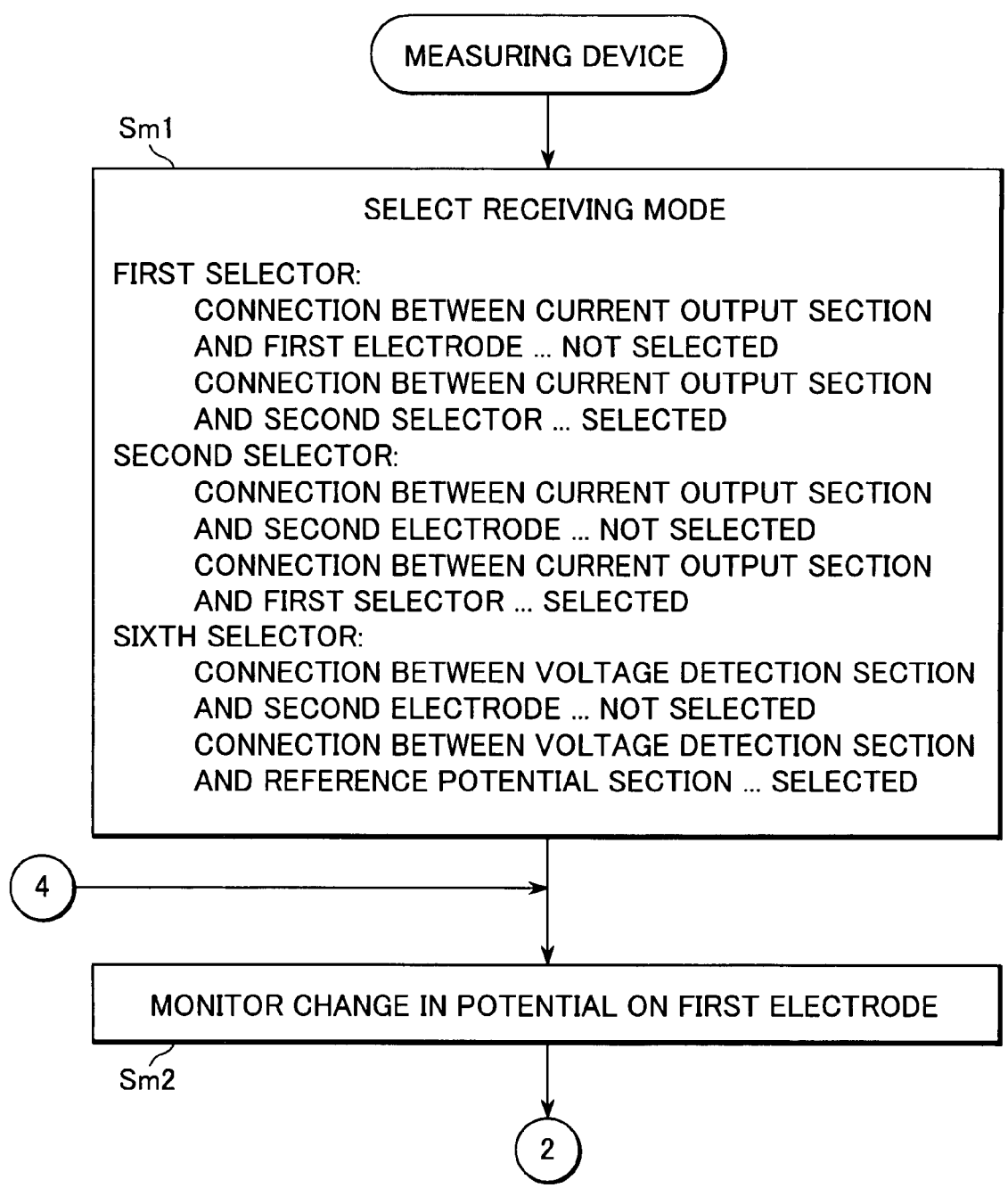

TO FIG. 9C

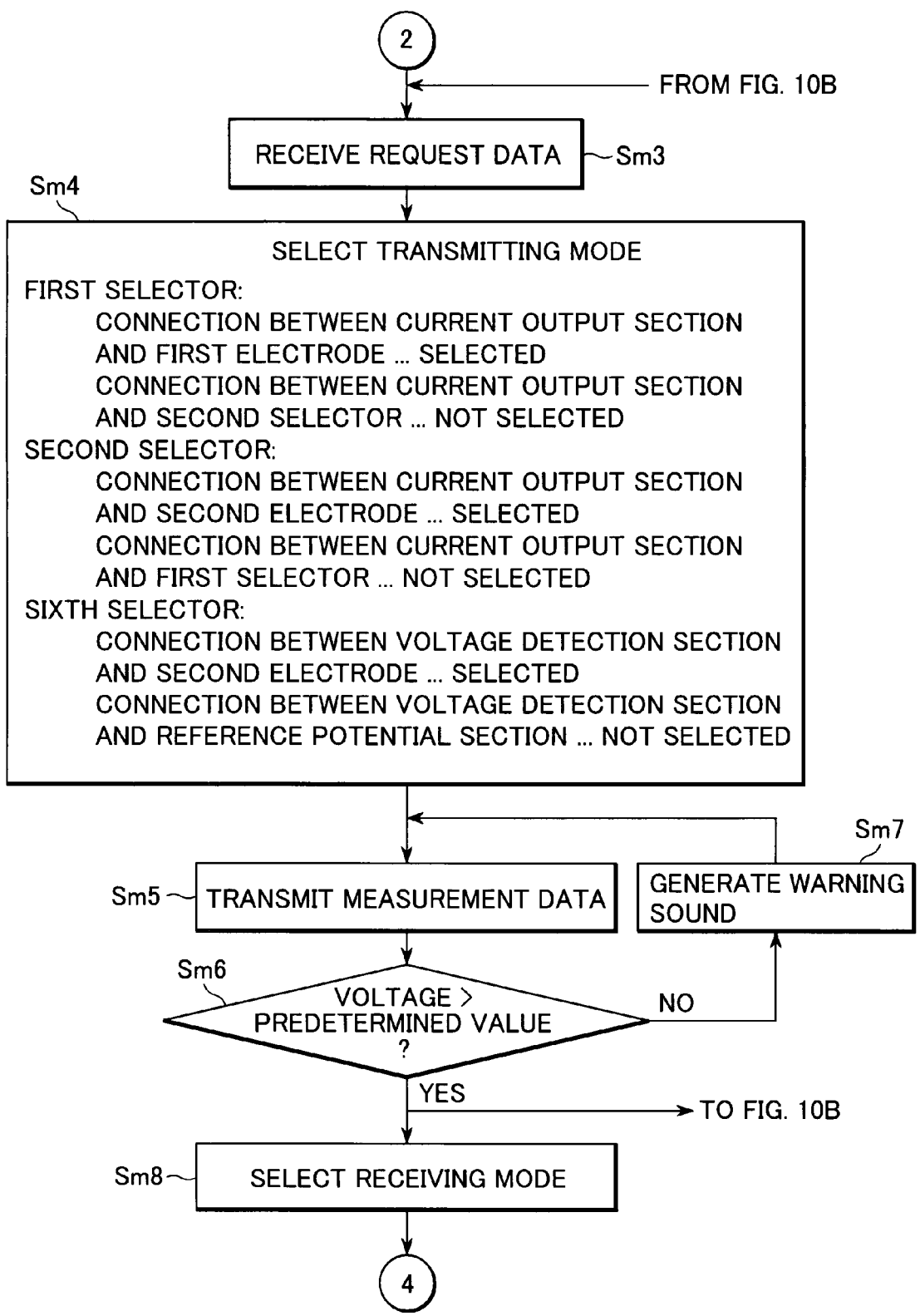

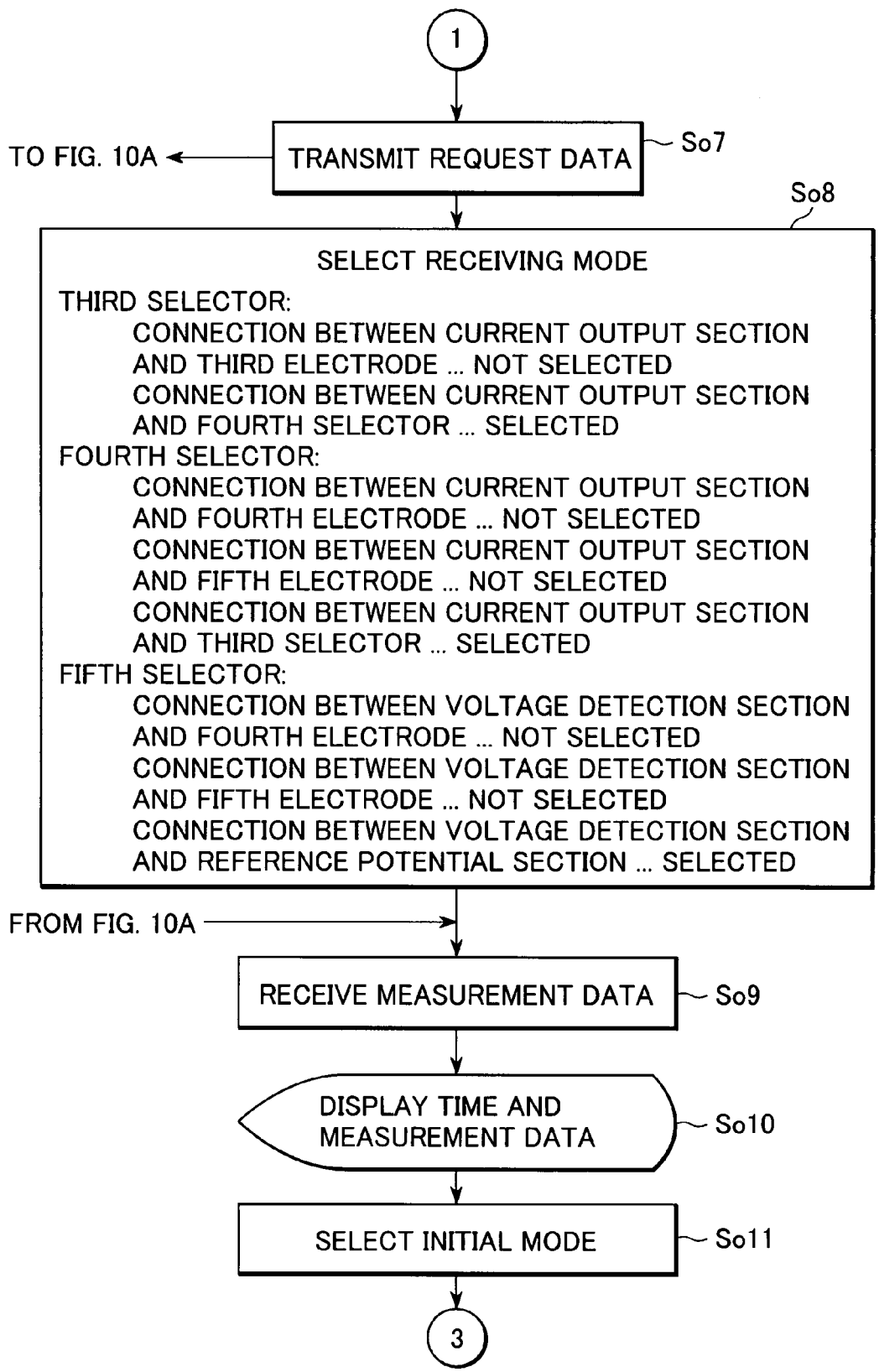

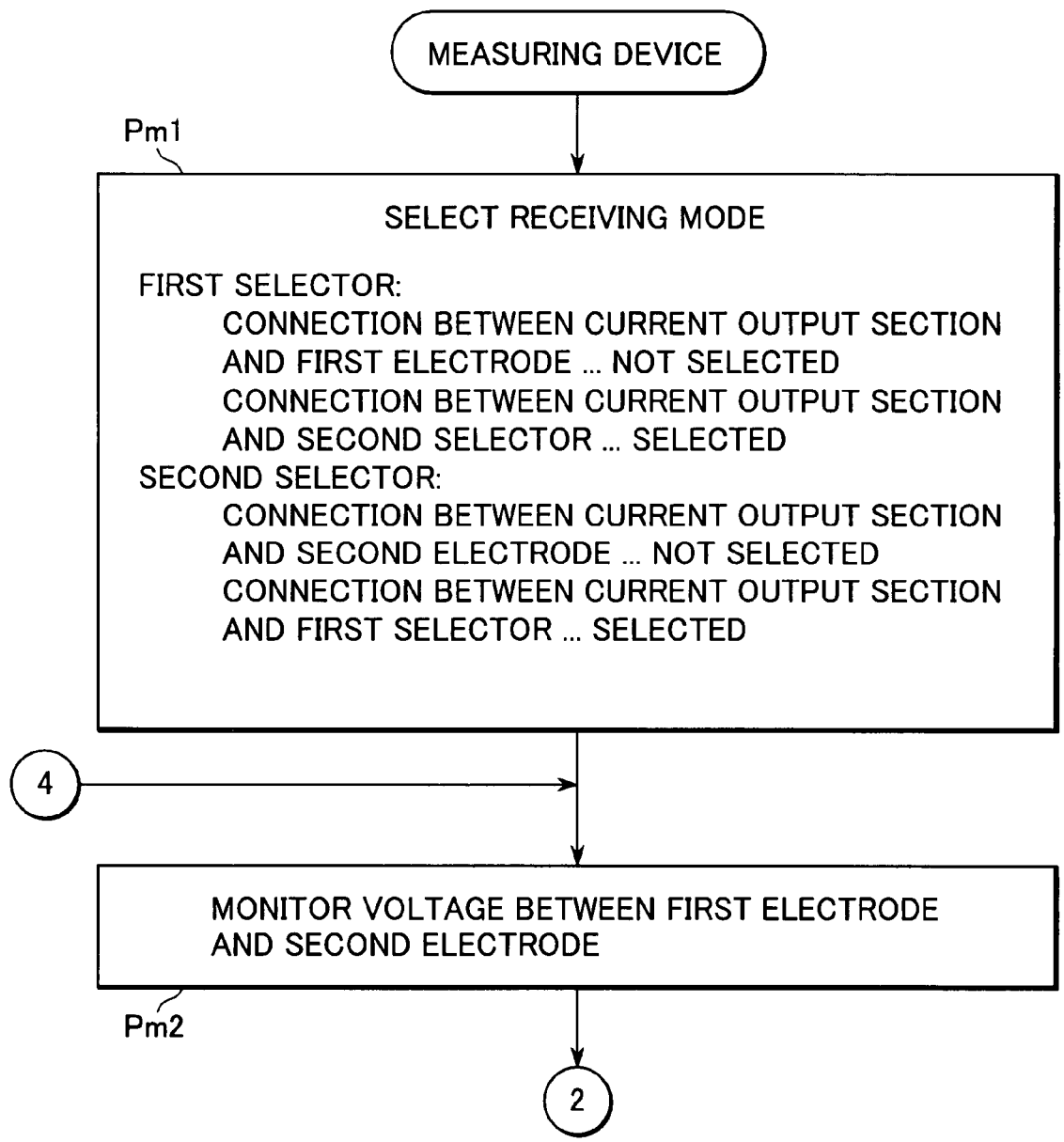

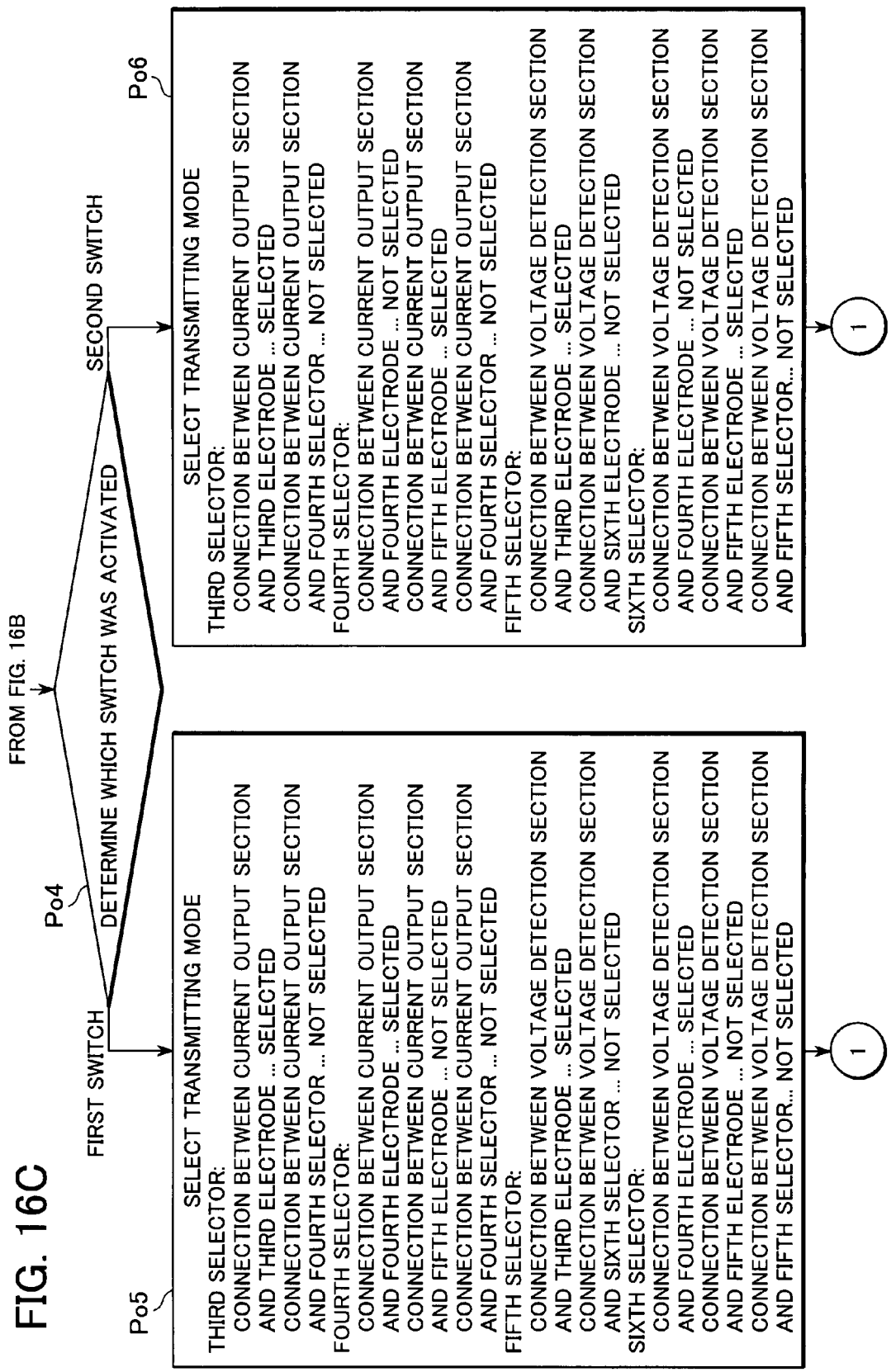

ACTIVITY INFORMATION METER

BACKGROUND OF THE INVENTION (i) Field of the Invention

This invention relates to an activity information meter in which a measuring device that measures activity information and an output device that outputs the measured activity information to a user communicates with each other via a body as a medium.

(ii) Description of the Related Art

An activity information meter comprising a measuring device that measures activity information and an output device that outputs the measured activity information to a user in integrated form is large and heavy. Thus, it is conceived to reduce the size and weight of the activity information meter by forming the measuring device and the output device as separate units and thereby dispersing the size and weight. An activity information meter comprising the measuring device and the output device as separate units can be achieved by using an indirect transmission system using static induction or electromagnetic induction which is disclosed in Patent Literature 1, 2 or 3 or a direct transmission system which detects a change in potential at different spots by passing a minute current through a living body which is disclosed in Patent Literature 4 or 5 as a communication technique between the measuring device and the output device.

Patent Literature 1 Japanese Patent Application Laid-Open No. 229357-1998

Patent Literature 2 Japanese Patent Application Laid-Open No. 228524-1998

Patent Literature 3 Japanese Patent Application Laid-Open No. 557-2003

Patent Literature 4 Japanese Patent Application Laid-Open No. 143086-2003

Patent Literature 5 Japanese Patent Application Laid-Open No. 77735-2001

However, when the indirect transmission system disclosed in the above Patent Literatures is used as a communication technique between the measuring device and the output device, there is a problem that a potential is not stabilized and communication is cut off intermittently when a body is moving or the surrounding environment changes because the above system uses the ground as a reference potential. Meanwhile, when the direct transmission system disclosed in the above Patent Literatures is used, there is a problem that a user is subjected to practically inconvenient restrictions one of which is that data transmission is possible only in the transmission direction from the data transmitting device toward the data receiving device because the data receiving device is connected to the earth.

The present invention has been conceived to solve the above problems of the prior art. An object of the present invention is to provide an activity information meter which ensures stable communication between a measuring device and an output device and is highly convenient.

SUMMARY OF THE INVENTION

According to one aspect, an activity information meter of the present invention comprises a measuring device and an output device which are formed separately and transmit measurement data and control data via a body as a medium, the measuring device comprising:

a measurement section, an oscillation section for the measuring device, a modulation section for the measuring device, a current output section for the measuring device, a transmitting/receiving electrode for the measuring device, a transmitting electrode for the measuring device, a reference potential section for the measuring device, a voltage detection section for the measuring device, a demodulation section for the measuring device, a first selector, a second selector, a sixth selector, and a control section for the measuring device, the output device comprising:

an oscillation section for the output device, a modulation section for the output device, a current output section for the output device, a transmitting/receiving electrode for the output device, a transmitting electrode for the output device, a reference potential section for the output device, a voltage detection section for the output device, a demodulation section for the output device, a third selector, a fourth selector, a fifth selector, a control section for the output device, and an output section, wherein the measurement section measures activity information as measurement data, the oscillation section for the measuring device generates an alternating current signal, the modulation section for the measuring device modulates the alternating current signal generated by the oscillation section for the measuring device into a modulated signal based on the measurement data measured by the measurement section, the current output section for the measuring device outputs a current corresponding to the modulated signal modulated by the modulation section for the measuring device, the transmitting/receiving electrode for the measuring device contacts a body part between one end part and another end part of a body to pass the current output from the current output section for the measuring device through the body and detect a change in potential which occurs in the body, the transmitting electrode for the measuring device contacts a body part between the one end part of the body and the transmitting/receiving electrode for the measuring device to pass the current output from the current output section for the measuring device through the body, the reference potential section for the measuring device has a reference potential, the voltage detection section for the measuring device detects a voltage based on the reference potential of the reference potential section for the measuring device and the change in potential in the body which has been detected by the transmitting/receiving electrode for the measuring device, the demodulation section for the measuring device demodulates the voltage detected by the voltage detection section for the measuring device into a demodulated signal, the first selector selects connection between the current output section for the measuring device and the transmitting/receiving electrode for the measuring device or connection between the current output section for the measuring device and the second selector, the second selector selects connection between the current output section for the measuring device and the transmitting electrode for the measuring device or connection between the current output section for the measuring device and the first selector, the sixth selector selects connection between the transmitting electrode for the measuring device and the voltage detection section for the measuring device or connection between the reference potential section for the measuring device and the voltage detection section for the measuring device, the control section for the measuring device controls the first selector to select connection between the current output section for the measuring device and the second selector, controls the second selector to select connection between the current output section for the measuring device and the first selector and controls the sixth selector to select connection between the reference potential section for the measuring device and the voltage detection section for the measuring device when the measuring device receives control data, while the control section for the measuring device issues the measurement data measured by the measurement section to the modulation section for the measuring device and controls the first selector to select connection between the current output section for the measuring device and the transmitting/receiving electrode for the measuring device, controls the second selector to select connection between the current output section for the measuring device and the transmitting electrode for the measuring device and controls the sixth selector to select connection between the transmitting electrode for the measuring device and the voltage detection section for the measuring device when the measuring device transmits the measurement data, the oscillation section for the output device generates an alternating current signal, the modulation section for the output device modulates the alternating current signal generated by the oscillation section for the output device into a modulated signal based on control data, the current output section for the output device outputs a current corresponding to the modulated signal modulated by the modulation section for the output device, the transmitting/receiving electrode for the output device contacts one end part of the body to pass the current output from the current output section for the output device through the body and detect a change in potential which occurs in the body, the transmitting electrode for the output device contacts another end part of the body to pass the current output from the current output section for the output device through the body, the reference potential section for the output device has a reference potential, the voltage detection section for the output device detects a voltage based on the reference potential of the reference potential section for the output device and the change in potential in the body which has been detected by the transmitting/receiving electrode for the output device, the demodulation section for the output device demodulates the voltage detected by the voltage detection section for the output device into a demodulated signal, the third selector selects connection between the current output section for the output device and the transmitting/receiving electrode for the output device or connection between the current output section for the output device and the fourth selector, the fourth selector selects connection between the current output section for the output device and the transmitting electrode for the output device or connection between the current output section for the output device and the third selector, the fifth selector selects connection between the transmitting electrode for the output device and the voltage detection section for the output device or connection between the reference potential section for the output device and the voltage detection section for the output device, the control section for the output device issues control data to the modulation section for the output device and controls the third selector to select connection between the current output section for the output device and the transmitting/receiving electrode for the measuring device, controls the fourth selector to select connection between the current output section for the output device and the transmitting electrode for the output device and controls the fifth selector to select connection between the transmitting electrode for the output device and the voltage detection section for the output device when the output device transmits the control data, while the control section for the output device controls the third selector to select connection between the current output section for the output device and the fourth selector, controls the fourth selector to select connection between the current output section for the output device and the third selector and controls the fifth selector to select connection between the reference potential section for the output device and the voltage detection section for the output device when the output device receives the measurement data, and the output section outputs measurement data corresponding to the demodulated signal demodulated by the demodulation section for the output device.

Further, according to one embodiment of this aspect, a start switch which is activated when another end part of the body contacts the transmitting electrode for the output device is provided for each of the transmitting electrodes for the output device, and when transmitting control data, the control section for the output device issues control data corresponding to an activated start switch to the modulation section for the output device, controls the fourth selector to select connection between the current output section for the output device and a transmitting electrode for the output device which corresponds to the activated start switch and controls the fifth selector to select connection between the transmitting electrode for the output device which corresponds to the activated start switch and the voltage detection section for the output device.

Further, according to one embodiment of this aspect, the transmitting/receiving electrode for the measuring device and the transmitting electrode for the measuring device are placed on the measuring device such that the positional relationship between the transmitting/receiving electrode for the measuring device and the transmitting electrode for the measuring device is reversed when the measuring device is attached to the body.

Further, according to another embodiment of this aspect, the transmitting/receiving electrode for the measuring device and the transmitting electrode for the measuring device are placed on the measuring device such that the transmitting/receiving electrode for the measuring device and the transmitting electrode for the measuring device are distant from each other by at least 10 mm when the measuring device is attached to the body.

Further, according to another aspect, an activity information meter of the present invention comprises a measuring device and an output device which are formed separately and transmit measurement data and control data via a body as a medium, the measuring device comprising:

a measurement section, an oscillation section for the measuring device, a modulation section for the measuring device, a current output section for the measuring device, a first transmitting/receiving electrode for the measuring device, a second transmitting/receiving electrode for the measuring device, a voltage detection section for the measuring device, a demodulation section for the measuring device, a first selector, a second selector, and a control section for the measuring device, the output device comprising:

an oscillation section for the output device, a modulation section for the output device, a current output section for the output device, a first transmitting/receiving electrode for the output device, a second transmitting/receiving electrode for the output device, a voltage detection section for the output device, a demodulation section for the output device, a third selector, a fourth selector, a fifth selector, a sixth selector, a control section for the output device, and an output section, wherein the measurement section measures activity information as measurement data, the oscillation section for the measuring device generates an alternating current signal, the modulation section for the measuring device modulates the alternating current signal generated by the oscillation section for the measuring device into a modulated signal based on the measurement data measured by the measurement section, the current output section for the measuring device outputs a current corresponding to the modulated signal modulated by the modulation section for the measuring device, the first transmitting/receiving electrode for the measuring device contacts a body part between one end part and another end part of a body to pass the current output from the current output section for the measuring device through the body and detect a potential which occurs in the body part, the second transmitting/receiving electrode for the measuring device contacts a body part between the one end part of the body and the first transmitting/receiving electrode for the measuring device to pass the current output from the current output section for the measuring device through the body and detect a potential which occurs in the body part, the voltage detection section for the measuring device detects a voltage based on the potential in the body part which has been detected by the first transmitting/receiving electrode for the measuring device and the potential in the body part which has been detected by the second transmitting/receiving electrode for the measuring device, the demodulation section for the measuring device demodulates the voltage detected by the voltage detection section for the measuring device into a demodulated signal, the first selector selects connection between the current output section for the measuring device and the first transmitting/receiving electrode for the measuring device or connection between the current output section for the measuring device and the second selector, the second selector selects connection between the current output section for the measuring device and the second transmitting/receiving electrode for the measuring device or connection between the current output section for the measuring device and the first selector, the control section for the measuring device controls the first selector to select connection between the current output section for the measuring device and the second selector and controls the second selector to select connection between the current output section for the measuring device and the first selector when the measuring device receives control data, while the control section for the measuring device issues the measurement data measured by the measurement section to the modulation section for the measuring device and controls the first selector to select connection between the current output section for the measuring device and the first transmitting/receiving electrode for the measuring device and controls the second selector to select connection between the current output section for the measuring device and the second transmitting/receiving electrode for the measuring device when the measuring device transmits the measurement data, the oscillation section for the output device generates an alternating current signal, the modulation section for the output device modulates the alternating current signal generated by the oscillation section for the output device into a modulated signal based on control data, the current output section for the output device outputs a current corresponding to the modulated signal modulated by the modulation section for the output device, the first transmitting/receiving electrode for the output device contacts one end part of the body to pass the current output from the current output section for the output device through the body and detect a potential which occurs in the body part, the second transmitting/receiving electrode for the output device contacts another end part of the body to pass the current output from the current output section for the output device through the body and detect a potential which occurs in the body part, the voltage detection section for the output device detects a voltage based on the potential in the body part which has been detected by the first transmitting/receiving electrode for the output device and the potential in the body part which has been detected by the second transmitting/receiving electrode for the output device, the demodulation section for the output device demodulates the voltage detected by the voltage detection section for the output device into a demodulated signal, the third selector selects connection between the current output section for the output device and the first transmitting/receiving electrode for the output device or connection between the current output section for the output device and the fourth selector, the fourth selector selects connection between the current output section for the output device and the second transmitting/receiving electrode for the output device or connection between the current output section for the output device and the third selector, the fifth selector selects connection between the first transmitting/receiving electrode for the output device and the voltage detection section for the output device or connection between the voltage detection section for the output device and the sixth selector, the sixth selector selects connection between the second transmitting/receiving electrode for the output device and the voltage detection section for the output device or connection between the voltage detection section for the output device and the fifth selector, the control section for the output device issues control data to the modulation section for the output device and controls the third selector to select connection between the current output section for the output device and the first transmitting/receiving electrode for the output device, controls the fourth selector to select connection between the current output section for the output device and the second transmitting/receiving electrode for the output device, controls the fifth selector to select connection between the first transmitting/receiving electrode for the output device and the voltage detection section for the output device and controls the sixth selector to select connection between the second transmitting/receiving electrode for the output device and the voltage detection section for the output device when the output device transmits the control data, while the control section for the output device controls the third selector to select connection between the current output section for the output device and the fourth selector, controls the fourth selector to select connection between the current output section for the output device and the third selector, controls the fifth selector to select connection between the first transmitting/receiving electrode for the output device and the voltage detection section for the output device and controls the sixth selector to select connection between the second transmitting/receiving electrode for the output device and the voltage detection section for the output device when the output device receives measurement data, and the output section outputs measurement data corresponding to the demodulated signal demodulated by the demodulation section for the output device.

Further, according to one embodiment of this another aspect, a start switch which is activated when another end part of the body contacts the second transmitting/receiving electrode for the output device is provided for each of the second transmitting/receiving electrodes for the output device, and when transmitting control data, the control section for the output device issues control data corresponding to an activated start switch to the modulation section for the output device, controls the fourth selector to select connection between the current output section for the output device and a second transmitting/receiving electrode for the output device which corresponds to the activated start switch and controls the sixth selector to select connection between the second transmitting/receiving electrode for the output device which corresponds to the activated start switch and the voltage detection section for the output device, while when receiving measurement data, the control section for the output device controls the fourth selector to select connection between the current output section for the output device and the third selector and controls the sixth selector to select connection between the second transmitting/receiving electrode for the output device which corresponds to the activated start switch and the voltage detection section for the output device.

Further, according to one embodiment of this another aspect, the first transmitting/receiving electrode for the measuring device and the second transmitting/receiving electrode for the measuring device are placed on the measuring device such that the positional relationship between the first transmitting/receiving electrode for the measuring device and the second transmitting/receiving electrode for the measuring device is reversed when the measuring device is attached to the body.

Further, according to another embodiment of this another aspect, the first transmitting/receiving electrode for the measuring device and the second transmitting/receiving electrode for the measuring device are placed on the measuring device such that the first transmitting/receiving electrode for the measuring device and the second transmitting/receiving electrode for the measuring device are distant from each other by at least 10 mm when the measuring device is attached to the body.

According to the activity information meter of one aspect, the measuring device has the first selector between the current output section for the measuring device and the transmitting/receiving electrode for the measuring device and the second selector, has the second selector between the current output section for the measuring device and the transmitting electrode for the measuring device and the first selector and has the sixth selector between the transmitting electrode for the measuring device and the voltage detection section for the measuring device and the reference potential section for the measuring device and has a reference potential in the reference potential section for the measuring device; the output device has the third selector between the current output section for the output device and the transmitting/receiving electrode for the output device and the fourth selector, has the fourth selector between the current output section for the output device and the transmitting electrode for the output device and the third selector and has the fifth selector between the transmitting electrode for the output device and the voltage detection section for the output device and the reference potential section for the output device and has a reference potential in the reference potential section for the output device; when the first selector, the second selector and the sixth selector are in the connection relationship of receiving mode, the fourth selector, the third selector and the fifth selector are in the connection relationship of transmitting mode, and the output device transmits control data to the measuring device; and when the fourth selector, the third selector and the fifth selector are in the connection relationship of receiving mode, the first selector, the second selector and the sixth selector are in the connection relationship of transmitting mode, and the measuring device transmits measurement data to the output device. This makes the activity information meter capable of stable, bidirectional transmission which is hardly influenced by the environment and highly convenient.

Further, since the activity information meter has multiple pairs of the transmitting electrodes for the output device and start switches and the fourth selector selects connection between the current output section for the output device and a transmitting electrode for the output device which corresponds to an activated start switch and the fifth selector selects connection between the transmitting electrode for the output device which corresponds to the activated start switch and the voltage detection section for the output device when the control section for the output device transmits control data, a subject can know only necessary, specific measurement data out of many kinds of measurement data, thereby making the activity information meter more convenient.

Further, since the positional relationship between the transmitting/receiving electrode for the measuring device and the transmitting electrode for the measuring device is reversed when the measuring device is attached to a body, a possibility that energization may occur due to sweating or capillaries and disturb transmission can be eliminated.

Further, since the transmitting/receiving electrode for the measuring device and the transmitting electrode for the measuring device are distant from each other by at least 10 mm when the measuring device is attached to a body, a possibility that energization may occur due to sweating or capillaries and disturb transmission can be eliminated.

Further, according to the activity information meter of another aspect, the measuring device has the first selector between the current output section for the measuring device and the first transmitting/receiving electrode for the measuring device and the second selector and has the second selector between the current output section for the measuring device and the second transmitting/receiving electrode for the measuring device and the first selector; the output device has the third selector between the current output section for the output device and the first transmitting/receiving electrode for the output device and the fourth selector, has the fourth selector between the current output section for the output device and the second transmitting/receiving electrode for the output device and the third selector, has the fifth selector between the first transmitting/receiving electrode for the output device and the voltage detection section for the output device and the sixth selector and has the sixth selector between the second transmitting/receiving electrode for the output device and the voltage detection section for the output device and the fifth selector; when the first selector and the second selector are in the connection relationship of receiving mode, the third selector, the fourth selector, the fifth selector and the sixth selector are in the connection relationship of transmitting mode, and the output device transmits control data to the measuring device; and when the third selector, the fourth selector, the fifth selector and the sixth selector are in the connection relationship of receiving mode, the first selector and the second selector are in the connection relationship of transmitting mode, and the measuring device transmits measurement data to the output device. This makes the activity information meter capable of stable, bidirectional transmission which is hardly influenced by the environment and highly convenient.

Further, since the activity information meter has multiple pairs of the transmitting electrodes for the output device and start switches, the fourth selector selects connection between the current output section for the output device and a transmitting electrode for the output device which corresponds to an activated start switch and the fifth selector selects connection between the transmitting electrode for the output device which corresponds to the activated start switch and the voltage detection section for the output device when the control section for the output device transmits control data, and the fourth selector selects connection between the current output section for the output device and the third selector and the sixth selector selects connection between the second transmitting/receiving electrode for the output device which corresponds to the activated start switch and the voltage detection section for the output device when the control section for the output device receives measurement data, a subject can know only necessary, specific measurement data out of many kinds of measurement data, thereby making the activity information meter more convenient.

Further, since the positional relationship between the first transmitting/receiving electrode for the measuring device and the second transmitting/receiving electrode for the measuring device is reversed when the measuring device is attached to a body, a possibility that energization may occur due to sweating or capillaries and disturb transmission can be eliminated.

Further, since the first transmitting/receiving electrode for the measuring device and the second transmitting/receiving electrode for the measuring device are distant from each other by at least 10 mm when the measuring device is attached to a body, a possibility that energization may occur due to sweating or capillaries and disturb transmission can be eliminated.

BRIEF DESCRIPTION OF THE DRAWINGS

FIG. 3 is a block diagram illustrating the constitution of the output device in the activity information meter (Example 1).

FIG. 4 is a diagram illustrating the posture of a body when no data is transmitted between the measuring device and the output device (Examples 1 and 2).

FIG. 5 is a diagram illustrating the posture of a body when data is transmitted between the measuring device and the output device (Examples 1 and 2).

FIG. 6 is an equivalent circuit diagram illustrating a state when no data is transmitted between the measuring device and the output device electrically (Example 1).

FIG. 10 (10A and 10B) is a flowchart illustrating a flow (second half) of the operations of the activity information meter (Example 1).

DETAILED DESCRIPTION OF THE PREFERRED EMBODIMENTS

An activity information meter of the present invention comprises a measuring device which measures activity information and an output device which outputs the measured activity information to a user (subject), the measuring device and the output device being formed separately, and the activity information meter has selectors for selecting a transmission route on proper spots so that bidirectional data transmission between the measuring device and the output device via a body as a medium is achieved. Further, the activity information meter of the present invention detects a change in potential based on a reference potential at the time of reception without using the earth as a reference potential or detects a voltage generated based on a body part impedance without using the earth as a reference potential. Thereby, the activity information meter is hardly influenced by the environment.

Hereinafter, examples will be described in detail with reference to the drawings.

EXAMPLE 1

In Example 1, an activity information meter in which an output device or a measuring device detects a change in potential based on a reference potential upon reception will be described in detail with reference to FIGS. 1 to 10 (10A and 10B).

Figure 1:
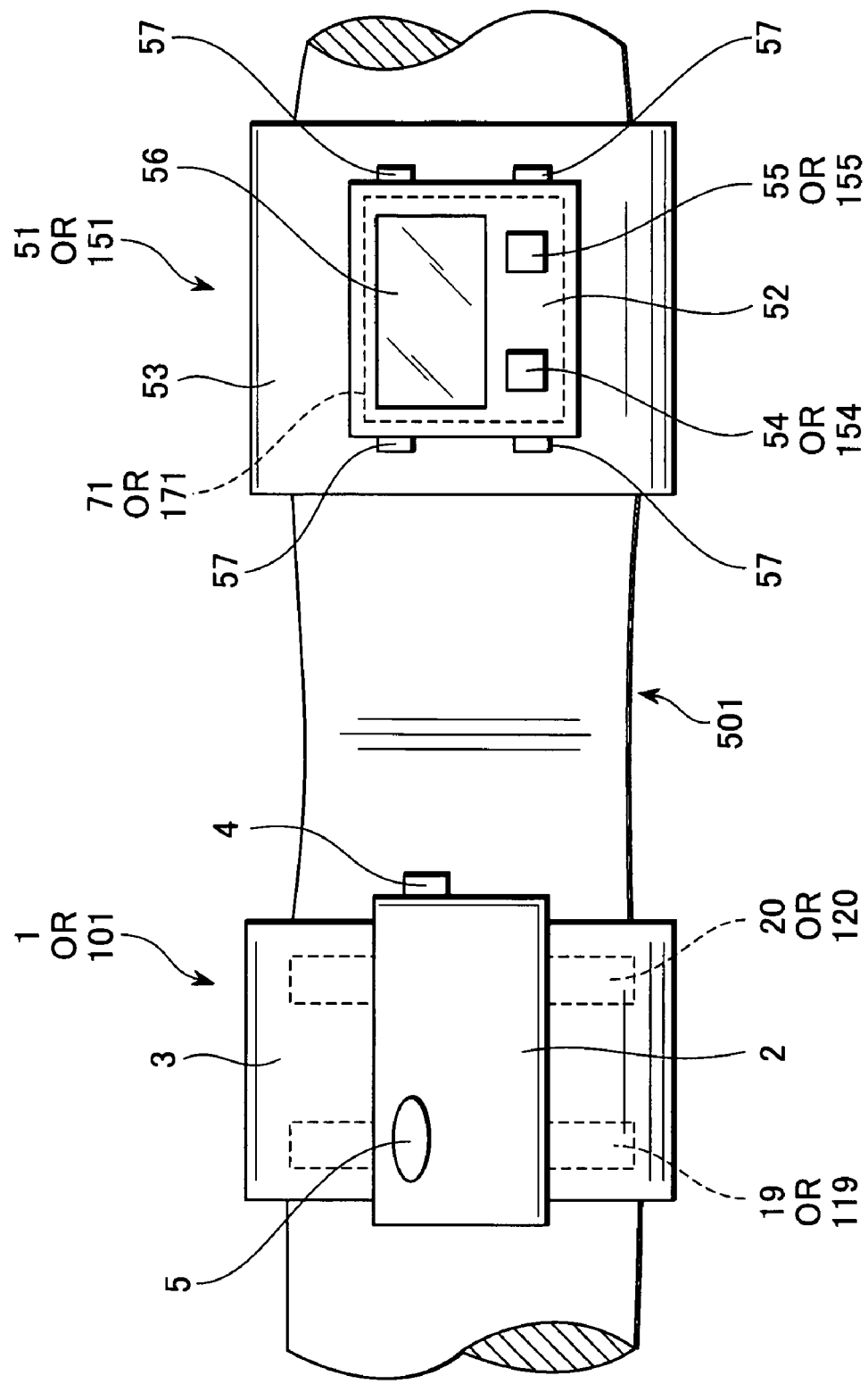
FIG. 1 is an external view of a measuring device in an activity information meter (Examples 1 and 2).

FIG. 1 is an external view of a measuring device in an activity information meter. As shown in FIG. 1, the activity information meter in Example 1 is constituted by a measuring device 1 and an output device 51 which are formed separately and transmit measurement data and control data via a body as a medium and is attached to an arm 501 when used.

The constitution of the measuring device 1 will be described in detail.

Figure 2:
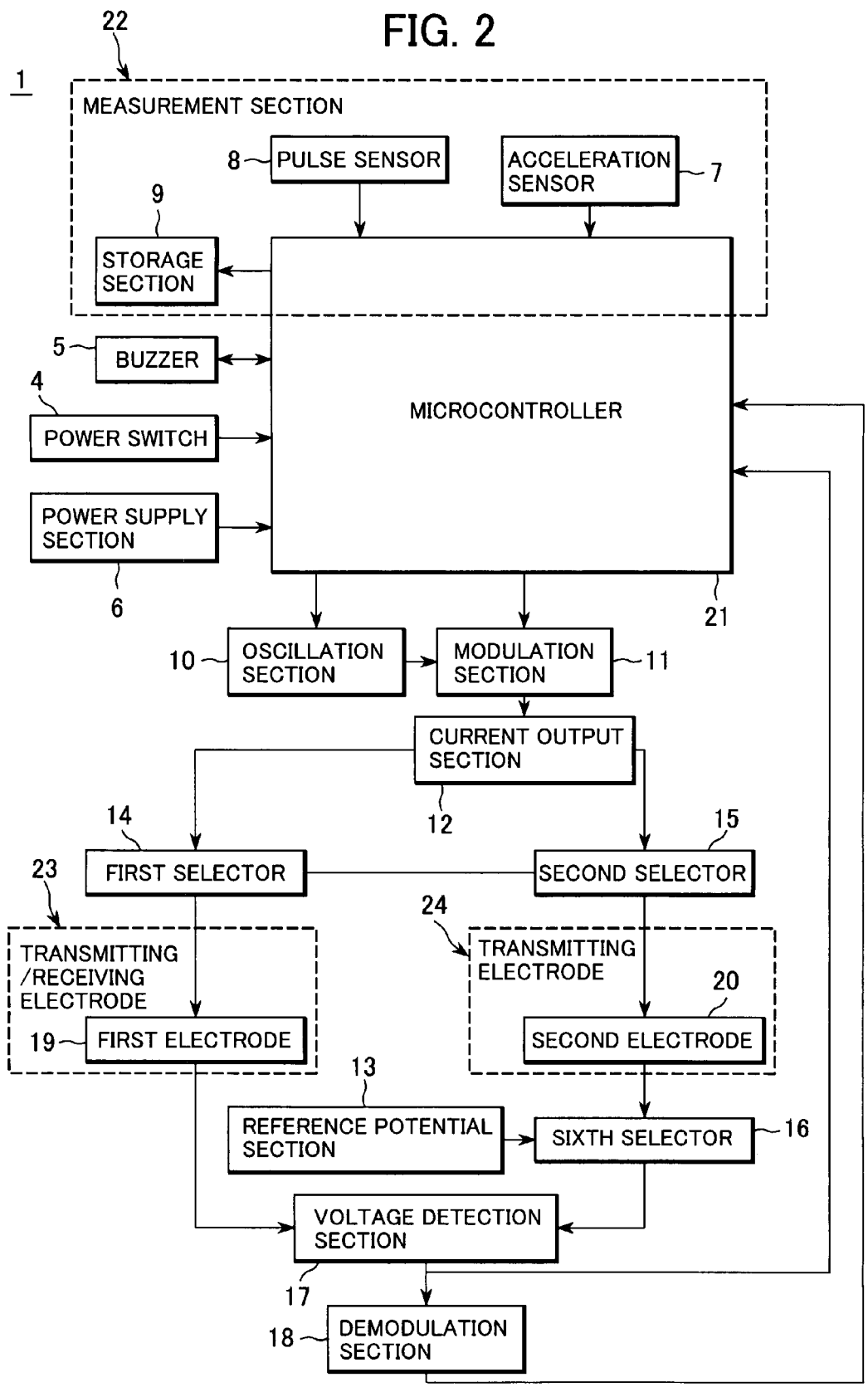
FIG. 2 is a block diagram illustrating the constitution of the measuring device in the activity information meter (Example 1).

FIG. 2 is a block diagram illustrating the constitution of the measuring device in the activity information meter as Example 1. As shown in FIG. 1 or 2, the measuring device 1 is roughly constituted by a case 2 and a band 3 which is wrapped around the left upper arm of the arm 501 to attach the case 2, measures a pulse rate and a movement speed as activity information (measurement data) and communicates with the output device 51.

The case 2 has a power switch 4 and a buzzer 5 on its external surface and also incorporates, on an electronic substrate, a power supply section 6, an acceleration sensor 7, a storage section 9, an oscillation section 10, a modulation section 11, a current output section 12, a reference potential section 13, a first selector 14, a second selector 15, a sixth selector 16, a voltage detection section 17, a demodulation section 18 and a microcontroller 21.

The band 3 has a first electrode 19, a second electrode 20 and a pulse sensor 8 on its arm-contacting surface.

Next, the sections provided in the case 2 and the band 3 in the measuring device 1 will be described in detail.

The power supply section 6 supplies power to the sections in the electrical system (i.e. power switch 4, buzzer 5, acceleration sensor 7, pulse sensor 8, storage section 9, oscillation section 10, modulation section 11, current output section 12, reference potential section 13, first electrode 19, second electrode 20, first selector 14, second selector 15, sixth selector 16, voltage detection section 17, demodulation section 18 and microcontroller 21).

The power switch 4 is a slide type and initiates supply of power from the power supply section 6 to the sections in the electrical system.

The buzzer 5 generates a warning sound when there is a possibility that measurement data cannot be transmitted.

The pulse sensor 8 is a piezoelectric type, and a pressure pulse wave is detected by the piezoelectric element.

The acceleration sensor 7 is a semiconductor piezoresistance type and detects acceleration when a subject 500 is in activity.

The storage section 9 stores a pulse rate determined by the microcontroller 21 based on the pressure pulse wave detected by the pulse sensor 8 and a movement speed determined by the microcontroller 21 based on the acceleration detected by the acceleration sensor 7 sequentially for each sampling. Further, the storage section 9 also stores information about computations, controls and timing performed by the microcontroller 21.

The oscillation section 10 generates an alternating current signal (e.g. carrier wave of 10 MHz).

The modulation section 11 modulates the alternating current signal generated by the oscillation section 10 into a modulated signal based on the measurement data stored in the storage section 9. More specifically, the modulation is performed such that a symbol 110 is selected in the case of a data bit 1 and a symbol 100 is selected in the case of a data bit 0, based on a combination of symbols 1 and 0 according to amplitude shift keying (ASK) of 38,400 bps. Further, the modulated signal is based on measurement data in packet form (e.g. manufacturer ID, product ID, command (44H), data length, data, check sum) issued by the microcontroller 21.

The current output section 12 outputs a current corresponding to the modulated signal modulated by the modulation section 11 (e.g. 300 mA in the case of the symbol 1, 0 mA in the case of the symbol 0). The current passed in the case of the symbol 1 is 300 mA so as to make it possible to detect it as a large signal which is hardly influenced by noise or the like without giving a harmful effect on a body.

The first electrode 19 is placed on the arm-contacting surface of the band 3 such that it is positioned closer to the shoulder when the band 3 is attached to the left upper arm. Further, the first electrode 19 is a transmitting/receiving electrode 23 and detects a change in potential which occurs in a body when a current is passed through the body from a current output section 12 of the output device or cooperates with the second electrode 20 to pass a current output from the current output section 12 through the body.

The second electrode 20 is placed on the arm-contacting surface of the band 3 such that it is positioned closer to the elbow when the band 3 is attached to the left upper arm. Further, the second electrode 20 is a transmitting electrode 24 and cooperates with the first electrode 19 to pass a current output from the current output section 12 through the body.

Figure 20A:
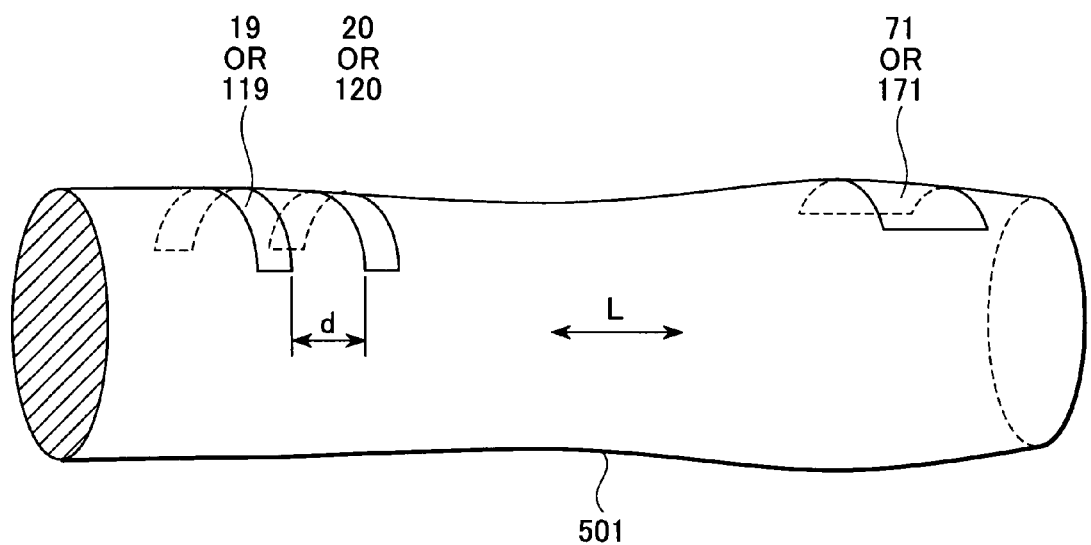
FIG. 20 is electrode arrangement diagrams illustrating the positions of the electrodes of the measuring device when a band is attached to an upper arm, wherein (a) illustrates a state when the electrodes are situated side by side, and (b) illustrates a state when the electrodes are situated at opposite sides.

The first electrode 19 and the second electrode 20 are placed with a distance d of at least 10 mm therebetween in the direction of transmission (i.e. longitudinal direction of the arm) L, as shown in FIG. 20(a). This is because energization may occur due to sweating or capillaries and disturb transmission. In consideration of the size of the measuring device 1 which can be attached to the upper arm easily, the distance d between the electrodes is preferably about 30 mm.

The reference potential section 13 has a reference potential.

The voltage detection section 17 detects a voltage based on the reference potential of the reference potential section 13 and the change in potential in the body which has been detected by the first electrode 19.

The demodulation section 18 demodulates the voltage detected by the voltage detection section 17 into a demodulated signal.

The first selector 14 selects connection between the current output section 12 and the first electrode 19 or connection between the current output section 12 and the second selector 15.

The second selector 15 selects connection between the current output section 12 and the second electrode 20 or connection between the current output section 12 and the first selector 14.

The sixth selector 16 selects connection between the second electrode 20 and the voltage detection section 17 or connection between the reference potential section 13 and the voltage detection section 17.

The microcontroller 21 comprises a storage section, a timing section, a computation section and a control section and performs processes such as controls associated with various computations, determinations and storages including the following i) to v).

i) It controls the pulse sensor 8 to detect a pressure pulse wave, computes a pulse rate based on the detected pressure pulse wave and controls the storage section 9 to store the computed pulse rate as measurement data.

ii) It controls the acceleration sensor 7 to detect an acceleration, computes a movement speed based on the detected acceleration and controls the storage section 9 to store the computed movement speed as measurement data.

iii) It controls the oscillation section 10 to generate an alternating current signal when receiving control data (data requesting transmission of measurement data or data for performing various controls for the measuring device).

iv) It issues measurement data to the modulation section 11. The measurement data is issued in packet form (e.g. manufacturer ID, product ID, command (44H), data length, data, check sum).

v) When it receives control data (i.e. when it is in receiving mode), it controls the first selector 14 to select connection between the current output section 12 and the second selector 15, controls the second selector 15 to select connection between the current output section 12 and the first selector 14, and controls the sixth selector 16 to select connection between the reference potential section 13 and the voltage detection section 17. Meanwhile, when it transmits measurement data (i.e. when it is in transmitting mode), it controls the first selector 14 to select connection between the current output section 12 and the first electrode 19, controls the second selector 15 to select connection between the current output section 12 and the second electrode 20, and controls the sixth selector 16 to select connection between the second electrode 20 and the voltage detection section 17.

The above pulse sensor 8, acceleration sensor 7, storage section 9 and microcontroller 21 constitute a measurement section 22 which measures a pulse rate and a movement speed as activity information.

Next, the constitution of the output device 51 will be described in detail.

FIG. 3 is a block diagram illustrating the constitution of the output device in the activity information meter as Example 1. As shown in FIG. 1 or 3, the output device 51 is roughly constituted by a case 52 and a band 53 which is wrapped around the left wrist of the arm 501 to attach the case 52, normally displays time information, and acquires a pulse rate and a movement speed as activity information by transmission and displays them when the subject 500 desires to know the information.

The case 52 has an input section 57, a display section 56, a fourth electrode 54, a fifth electrode 55, a first switch 58 and a second switch 59 on its external surface and also incorporates, on an electronic substrate, a power supply section 60, an oscillation section 61, a modulation section 62, a current output section 63, a reference potential section 64, a third selector 66, a fourth selector 65, a fifth selector 67, a voltage detection section 68, a demodulation section 69 and a microcontroller 70.

The band 53 has a third electrode 71 on its arm-contacting surface.

Next, the sections provided in the case 52 and the band 53 in the output device 51 will be described in detail.

The power supply section 60 supplies power to the sections in the electrical system (i.e. input section 57, display section 56, oscillation section 61, modulation section 62, current output section 63, reference potential section 64, third electrode 71, fourth electrode 54, fifth electrode 55, first switch 58, second switch 59, third selector 66, fourth selector 65, fifth selector 67, voltage detection section 68, demodulation section 69 and microcontroller 70).

The input section 57 comprises four switches and inputs time information (time).

The display section 56 comprises an LCD (Liquid Crystal Display) and displays time information (time) and measurement data (pulse rate or movement speed).

The oscillation section 61 generates an alternating current signal (e.g. carrier wave of 10 MHz).

The modulation section 62 modulates the alternating current signal generated by the oscillation section 61 into a modulated signal based on control data. More specifically, the modulation is performed such that a symbol 110 is selected in the case of a data bit 1 and a symbol 100 is selected in the case of a data bit 0, based on a combination of symbols 1 and 0 according to amplitude shift keying of 38,400 bps. Further, the modulated signal is based on control data in packet form (e.g. manufacturer ID, product ID, command (44H), data length (01H), data (01H, 02H), checksum) issued by the microcontroller 70.

The current output section 63 outputs a current corresponding to the modulated signal modulated by the modulation section 62 (e.g. 300 mA in the case of the symbol 1, 0 mA in the case of the symbol 0).

The third electrode 71 is placed on the wrist-contacting surface of the band 53 when the band 53 is attached to the left wrist. Further, the third electrode 71 is a transmitting/receiving electrode 74 and detects a change in potential which occurs in a body when a current is passed through a body from the current output section 63 of the measuring device or cooperates with the fourth electrode 54 or the fifth electrode 55 to pass a current output from the current output section 63 through the body.

The fourth electrode 54 and the fifth electrode 55 are placed (on spots which do not contact the wrist) on the display surface of the band 53 when the band 53 is attached to the wrist. Further, the fourth electrode 54 and the fifth electrode 55 are transmitting electrodes 75 and cooperate with the third electrode 71 to pass a current output from the current output section 63 through the body.

The first switch 58 is situated under the fourth electrode 54 and activated when the right hand of the subject 500 touches the fourth electrode 54. The second switch 59 is situated under the fifth electrode 55 and activated when the right hand of the subject 500 touches the fifth electrode 55.

The reference potential section 64 has a reference potential.

The voltage detection section 68 detects a voltage based on the reference potential of the reference potential section 64 and the change in potential in the body which has been detected by the third electrode 71.

The demodulation section 69 demodulates the voltage detected by the voltage detection section 68 into a demodulated signal.

The third selector 66 selects connection between the current output section 63 and the third electrode 71 or connection between the current output section 63 and the fourth selector 65.

The fourth selector 65 selects connection between the current output section 63 and the fourth electrode 54 or the fifth electrode 55 or connection between the current output section 63 and the third selector 66.

The fifth selector 67 selects connection between the fourth electrode 54 or the fifth electrode 55 and the voltage detection section 68 or connection between the reference potential section 64 and the voltage detection section 68.

The microcontroller 70 comprises a storage section, a timing section, a computation section and a control section and performs processes such as controls associated with various inputs, computations, determinations, storages and displays including the following i) to v).

i) It controls the oscillation section 61 to generate an alternating current signal when receiving measurement data.

ii) It determines which one of the first switch 58 and the second switch 59 has been activated and issues control data (data requesting transmission of measurement data or data for performing various controls for the measuring device) to the modulation section 62. The control data is issued in packet form (e.g. manufacturer ID, product ID, command (44H), data length (01H), data (01H, 02H), check sum, in the case of the data requesting transmission of measurement data). The data is 01H (data indicating a request for a pulse rate) when the first switch 58 has been activated and 02H (data indicating a request for a movement speed) when the second switch 59 has been activated.

iii) When it does not transmit or receive measurement data and control data (i.e. when it is in initial mode), it controls the third selector 66 to select connection between the current output section 63 and the fourth selector 65, controls the fourth selector 65 to select connection between the current output section 63 and the third selector 66 and controls the fifth selector 67 to select connection between the reference potential section 64 and the voltage detection section 68. Meanwhile, when it transmits control data (i.e. when it is in transmitting mode), it controls the third selector 66 to select connection between the current output section 63 and the third electrode 71, controls the fourth selector 65 to select connection between the current output section 63 and the fourth electrode 54 or the fifth electrode 55 and controls the fifth selector 67 to select connection between the fourth electrode 54 or the fifth electrode 55 and the voltage detection section 68. Meanwhile, when it receives measurement data (i.e. when it is in receiving mode), it controls the third selector 66 to select connection between the current output section 63 and the fourth selector 65, controls the fourth selector 65 to select connection between the current output section 63 and the third selector 66 and controls the fifth selector 67 to select connection between the reference potential section 64 and the voltage detection section 68.

iv) It sets time information (time) based on time information (time) input from the input section 57 and updates the time information (time) according to passage of time timed by the timing section as needed.

v) It controls the display section 56 to display the above timed time information (time) and measurement data (pulse rate or movement speed) transmitted from the measuring device 1.

The display section 56 and the microcontroller 70 constitute an output section 72 which outputs measurement data corresponding to the demodulated signal demodulated by the demodulation section 69. Further, the first switch 58 and the second switch 59 constitute a start switch 73 which is activated when another end part (right hand) of a body touches the transmitting electrode 75 (fourth electrode 54 or fifth electrode 55).

Figure 7A:
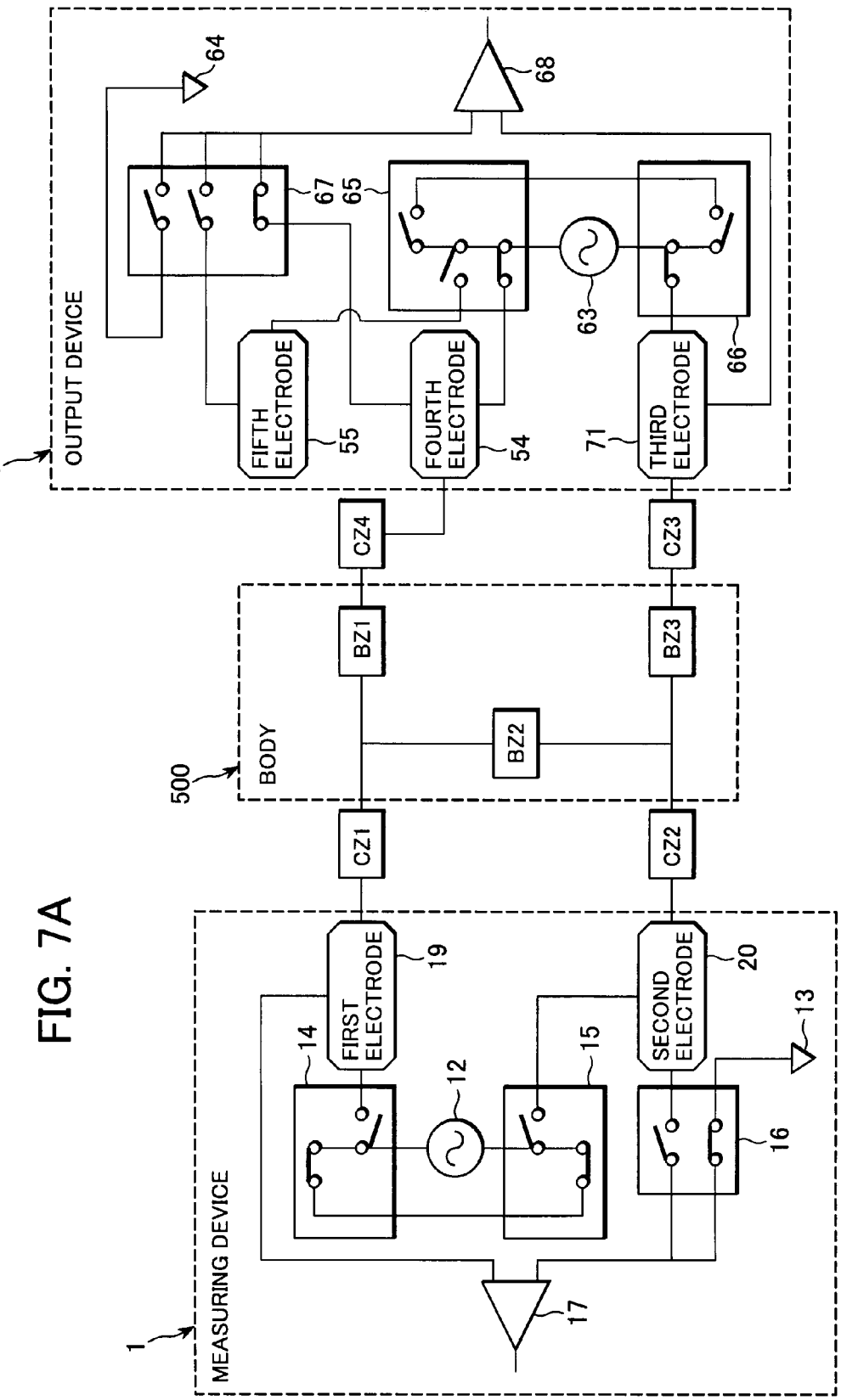
FIG. 7 is equivalent circuit diagrams illustrating a state when control data is transmitted from the output device to the measuring device electrically, wherein (a) illustrates a state when a fourth electrode 54 is selected to request a pulse rate as measurement data, and (b) illustrates a state when a fifth electrode 55 is selected to request a movement speed as measurement data (Example 1).
Figure 7B:
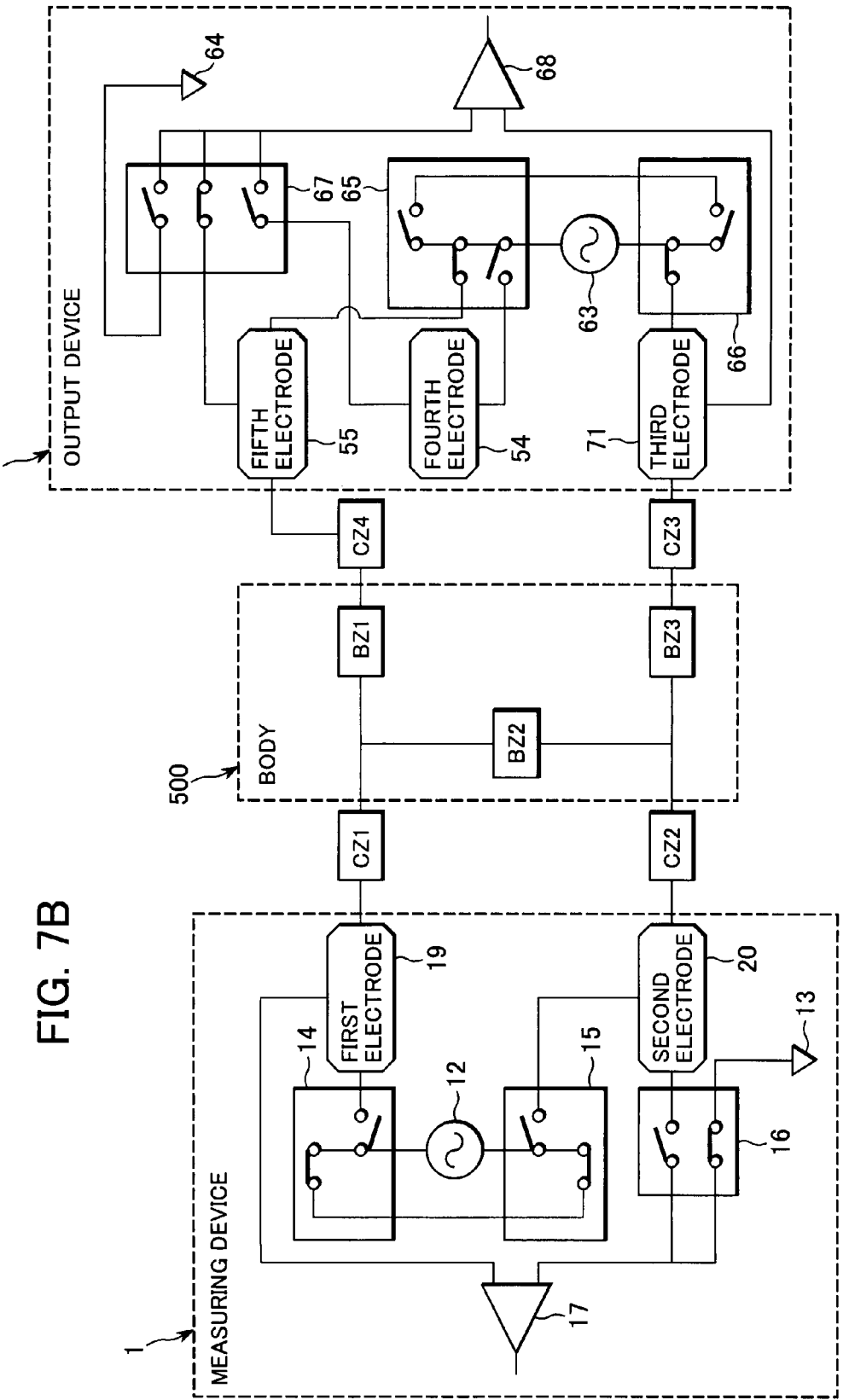
Figure 8:
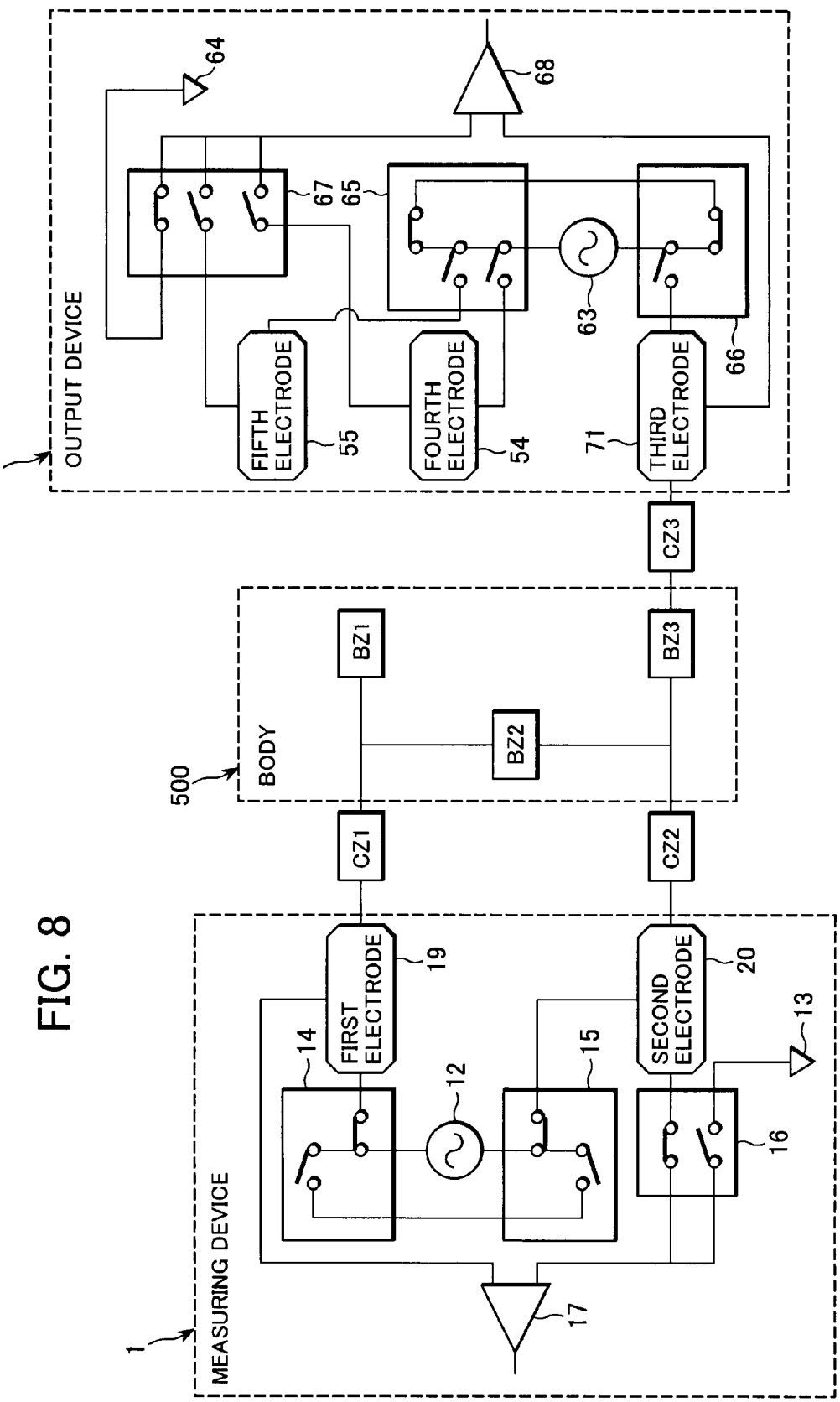
FIG. 8 is an equivalent circuit diagram illustrating a state when measurement data is transmitted from the measuring device to the output device electrically (Example 1).
Figure 9B:
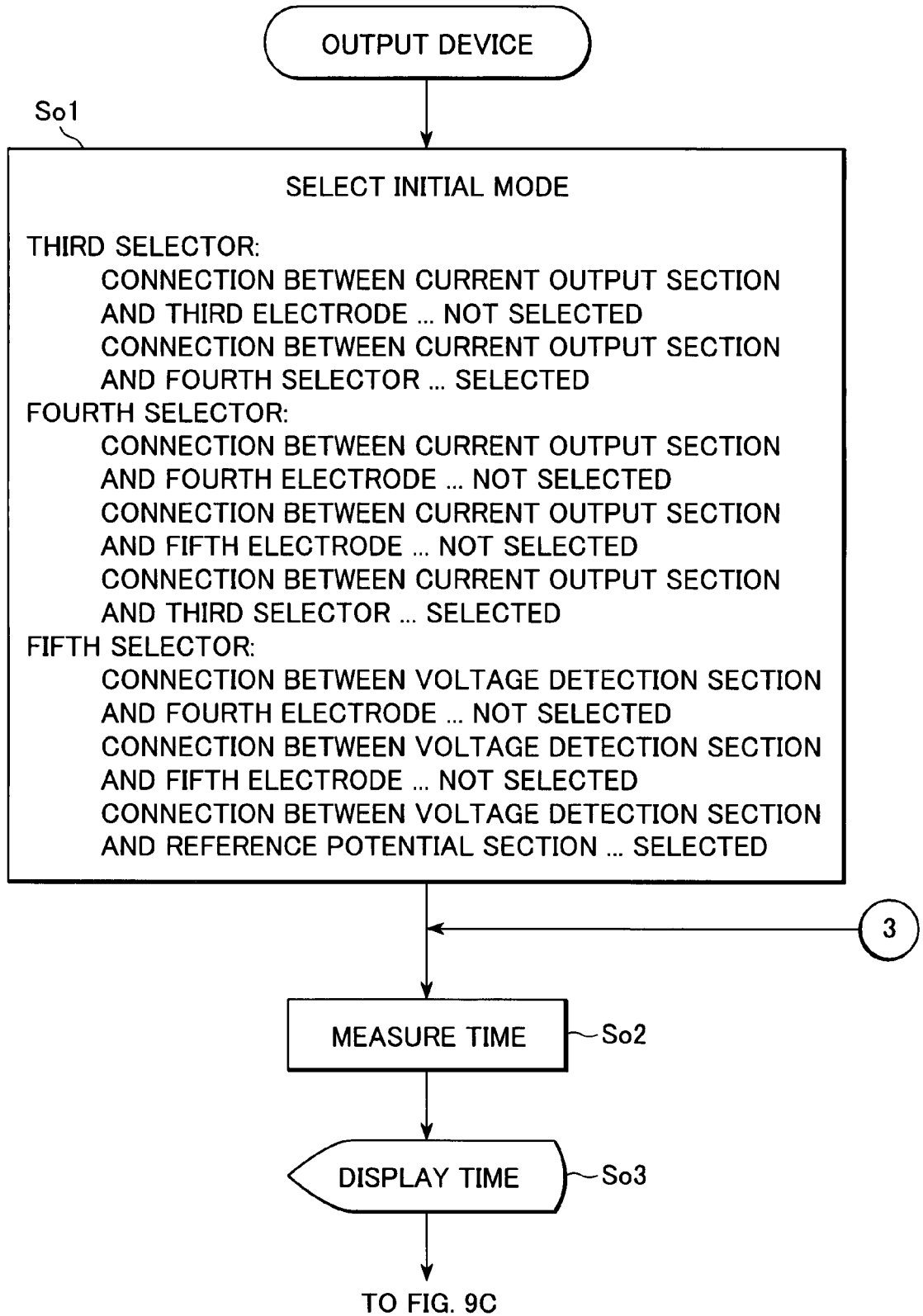
FIG. 9 (9A, 9B and 9C) is a flowchart illustrating a flow (first half) of the operations of the activity information meter (Example 1).
Figure 9C:
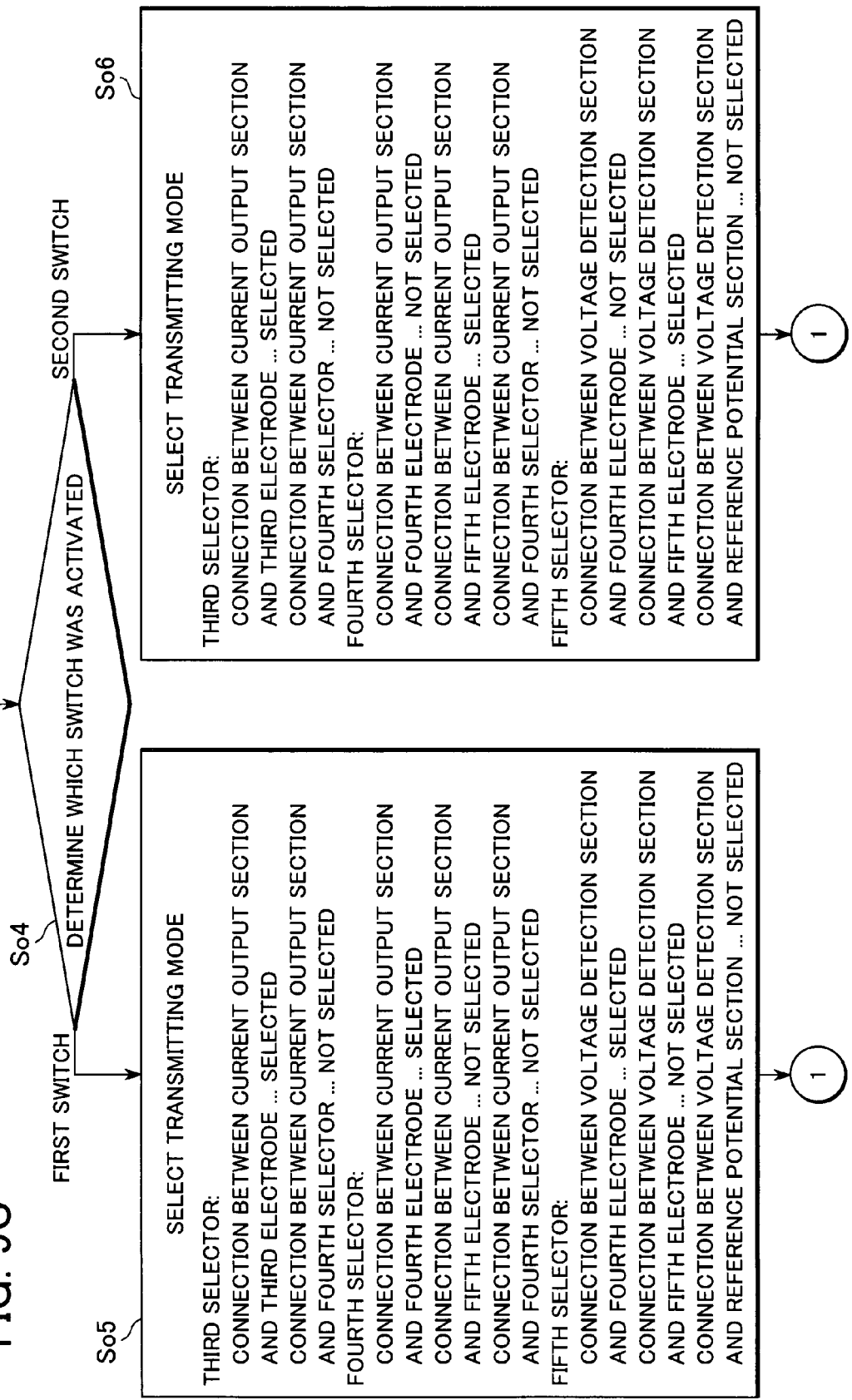

Next, FIG. 9 (9A, 9B and 9C) is a flowchart illustrating a flow (first half) of the operations of the activity information meter as Example 1. FIG. 10 (10A and 10B) is a flowchart illustrating a flow (second half) of the operations of the activity information meter as Example 1. FIG. 4 is a diagram illustrating the posture of a body when no data is transmitted between the measuring device 1 and the output device 51. FIG. 5 is a diagram illustrating the posture of a body when data is transmitted between the measuring device 1 and the output device 51. FIG. 6 is an equivalent circuit diagram illustrating a state when no data is transmitted between the measuring device 1 and the output device 51 electrically. FIG. 7 is equivalent circuit diagrams illustrating a state when control data is transmitted from the output device 51 to the measuring device 1 electrically, wherein (a) illustrates a state when the fourth electrode is selected to request a pulse rate as measurement data, and (b) illustrates a state when the fifth electrode is selected to request a movement speed as measurement data. FIG. 8 is an equivalent circuit diagram illustrating a state when measurement data is transmitted from the measuring device 1 to the output device 51 electrically.

In FIGS. 6, 7 and 8, BZ3 represents an impedance between the left wrist (one end part of a body) on which the third electrode 71 (transmitting/receiving electrode 74) is placed and a part of the left upper arm which is closer to the elbow and on which the second electrode 20 (transmitting electrode 24) is placed. BZ2 represents an impedance between the part of the left upper arm which is closer to the elbow and on which the second electrode 20 (transmitting electrode 24) is placed and a part of the left upper arm which is closer to the shoulder and on which the first electrode 19 (transmitting/receiving electrode 23) is placed. BZ1 represents an impedance between the part of the left upper arm which is closer to the shoulder and on which the first electrode 19 (transmitting/receiving electrode 23) is placed and the right hand (another end part of the body) on which the fourth electrode 54 or the fifth electrode 55 is placed. CZ1 represents a contact impedance which occurs between the first electrode 19 and the part of the left upper arm which is closer to the shoulder. CZ2 represents a contact impedance which occurs between the second electrode 20 and the part of the left upper arm which is closer to the elbow. CZ3 represents a contact impedance which occurs between the third electrode 71 and the left wrist (one end part of the body). CZ4 represents a contact impedance which occurs between the fourth electrode 54 or the fifth electrode 55 and the right hand (another end part of the body).

The activity information meter in Example 1 operates in accordance with the flow illustrated in FIGS. 9 (9A, 9B and 9C) and 10 (10A and 10B).

First, as shown in FIG. 4, the subject 500 attaches the measuring device 1 and the output device 51 to the left upper arm and the left wrist, respectively. Then, in the measuring device 1, when the power switch 4 is pressed, the power supply section 6 supplies power to the sections in the electrical system. Then, the microcontroller 21 controls the measuring device 1 to be in receiving mode so that the measuring device 1 receives control data from the output device 51. More specifically, the microcontroller 21 controls the first selector 14 to select connection between the current output section 12 and the second selector 15, controls the second selector 15 to select connection between the current output section 12 and the first selector 14 and controls the sixth selector 16 to select connection between the reference potential section 13 and the voltage detection section 17 (STEP Sm1).

Then, in the measuring device 1, the measurement section 22 measures a pulse rate and a movement speed. More specifically, the pulse sensor 8 detects a pressure pulse wave, the microcontroller 21 computes a pulse rate based on the detected pressure pulse wave, and the storage section 9 stores the computed pulse rate. Further, the acceleration sensor 7 detects acceleration, the microcontroller 21 computes a movement speed based on the detected acceleration, and the storage section 9 stores the computed movement speed. The microcontroller 21 controls the pulse sensor 8, the acceleration sensor 7 and the storage section 9 to perform the above series of processes for measurements of the pulse rate and the movement speed at a predetermined time interval. Further, the microcontroller 21 monitors reception of control data from the output device 51 (i.e. a change in potential on the first electrode 19) (STEP Sm2).

Meanwhile, in the output device 51, the power supply section 60 supplies power to the sections in the electrical system. Then, the microcontroller 70 controls the output device 51 to be in initial mode so that the output device 51 neither transmits nor receives measurement data and control data. More specifically, the microcontroller 70 controls the third selector 66 to select connection between the current output section 63 and the fourth selector 65, controls the fourth selector 65 to select connection between the current output section 63 and the third selector 66 and controls the fifth selector 67 to select connection between the reference potential section 64 and the voltage detection section 68 (STEP So1).

Then, in the output device 51, the microcontroller 70 times elapsed time and updates time information (time) according to the elapsed time as needed (STEP So2), and the display section 56 displays the time information (time) updated as needed (STEP So3). If desired, time information (time) can be input through the input section 57 to correct setting of the time information (time).

Then, in the output device 51, the microcontroller 70 determines which one of the first switch 58 and the second switch 59 has been activated (STEP So4). When the subject 500 has activated the first switch 58 by touching the fourth electrode 54 by the right hand as shown in FIG. 5 (first switch in STEP So4), the microcontroller 70 controls the third selector 66 to select connection between the current output section 63 and the third electrode 71, controls the fourth selector 65 to select connection between the current output section 63 and the fourth electrode 54 and controls the fifth selector 67 to select connection between the voltage detection section 68 and the fourth electrode 54 as shown in FIG. 7(a) (STEP So5). Meanwhile, when the subject 500 has activated the second switch 59 by touching the fifth electrode 55 by the right hand (second switch in STEP So4), the microcontroller 70 controls the third selector 66 to select connection between the current output section 63 and the third electrode 71, controls the fourth selector 65 to select connection between the current output section 63 and the fifth electrode 55 and controls the fifth selector 67 to select connection between the voltage detection section 68 and the fifth electrode 55 as shown in FIG. 7(b) (STEP So 6).

Then, in the output device 51, the oscillation section 61 generates an alternating current signal (e.g. carrier wave of 10 MHz). Further, together with this, the microcontroller 70 issues control data (data requesting transmission of measurement data) to the modulation section 62 in packet form (e.g. manufacturer ID, product ID, command (44H), data length (01H), data (01H), check sum) when the first switch 58 has been activated or in packet form (e.g. manufacturer ID, product ID, command (44H), data length (01H), data (02H), check sum) when the second switch 59 has been activated. Then, the modulation section 62 modulates the alternating current signal generated by the oscillation section 61 into a modulated signal based on the control data (that is, a symbol 110 is selected in the case of a data bit 1 and a symbol 100 is selected in the case of a data bit 0, based on a combination of symbols 1 and 0 according to amplitude shift keying of 38,400 bps). Then, the current output section 63 outputs a current corresponding to the modulated signal modulated by the modulation section 62 (e.g. 300 mA in the case of the symbol 1, 0 mA in the case of the symbol 0) (STEP So7). As a result, the current passes through a body part between the third electrode 71 and the fourth electrode 54 (i.e. between the left wrist and the right hand) when the first switch 58 has been activated, while the current passes through a body part between the third electrode 71 and the fifth electrode 55 (i.e. between the left wrist and the right hand) when the second switch 59 has been activated.

Then, in the output device 51, the microcontroller 70 controls the third selector 66 to select connection between the current output section 63 and the fourth selector 65, controls the fourth selector 65 to select connection between the current output section 63 and the third selector 66 and controls the fifth selector 67 to select connection between the voltage detection section 68 and the reference potential section 64 as shown in FIG. 8 (STEP So8).

Meanwhile, in the measuring device 1, the first electrode 19 detects a change in potential which occurs in the body when the current passes. As for the change in potential which occurs in the body, a potential of (BZ1+BZ2)×V1/(BZ1+BZ2+BZ3) occurs at the peak-to-peak when oscillated with amplitudes of V1 [V] and 0 [V]. Then, the voltage detection section 17 detects a voltage based on the reference potential of the reference potential section 13 and the change in potential in the body which has been detected by the first electrode 19. Then, the demodulation section 18 demodulates the voltage detected by the voltage detection section 17 into a demodulated signal (control data). Then, the microcontroller 21 takes in the control data (STEP Sm3).

Then, in the measuring device 1, the microcontroller 21 controls the first selector 14 to select connection between the current output section 12 and the first electrode 19, controls the second selector 15 to select connection between the current output section 12 and the second electrode 20 and controls the sixth selector 16 to select connection between the voltage detection section 17 and the second electrode 20 as shown in FIG. 8 (STEP Sm4).

Then, in the measuring device 1, the oscillation section 61 generates an alternating current signal (e.g. carrier wave of 10 MHz). Further, together with this, the microcontroller 21 issues measurement data to the modulation section 11 in packet form (e.g. manufacturer ID, product ID, command (44H), data length, data, check sum) in accordance with the control data taken in the measuring device 1. Then, the modulation section 11 modulates the alternating current signal generated by the oscillation section 10 into a modulated signal based on the measurement data (that is, a symbol 110 is selected in the case of a data bit 1 and a symbol 100 is selected in the case of a data bit 0, based on a combination of symbols 1 and 0 according to amplitude shift keying of 38,400 bps). Then, the current output section 12 constantly outputs a current corresponding to the modulated signal modulated by the modulation section 11 (e.g. 300 mA in the case of the symbol 1, 0 mA in the case of the symbol 0) (STEP Sm5). As a result, the current constantly passes through a body part between the first electrode 19 and the second electrode 20 (i.e. between the part of the left upper arm which is closer to the elbow and the part of the left upper arm which is closer to the shoulder).

Then, in the measuring device 1, the first electrode 19 detects a change in potential which occurs in the body part (between the part of the left upper arm which is closer to the elbow and the part of the left upper arm which is closer to the shoulder). Then, the voltage detection section 17 detects a voltage based on the reference potential of the reference potential section 13 and the change in potential in the body part (between the part of the left upper arm which is closer to the elbow and the part of the left upper arm which is closer to the shoulder) which has been detected by the first electrode 19. Then, the microcontroller 21 determines the size of the voltage detected by the voltage detection section 17 (STEP Sm6).

When the size of the detected voltage is lower than a predetermined value (NO in STEP Sm6), the microcontroller 21 controls the buzzer 5 to emit a warning sound and returns to STEP Sm5 (STEP Sm7). Meanwhile, when the size of the detected voltage is equal to or higher than the predetermined value (YES in STEP Sm6), the microcontroller 21 controls the measuring device 1 to be in receiving mode as in STEP Sm1 (STEP Sm8) and returns to STEP Sm2 to repeat the above series of processes.

Meanwhile, in the output device 51, when the subject 500 activates the first switch 58 by touching the fourth electrode 54 by the right hand, activates the first switch 58 by touching the fifth electrode 55 by the right hand or activates the input section 57 by the right hand, the third electrode 71 detects a change in potential which occurs in the body part (between the part of the left upper arm which is closer to the elbow and the part of the left upper arm which is closer to the shoulder). Then, the voltage detection section 68 detects a voltage based on the reference potential of the reference potential section 64 and the change in potential in the body part which has been detected by the third electrode 71. Then, the demodulation section 69 demodulates the voltage detected by the voltage detection section 68 into a demodulated signal (measurement data). Then, the microcontroller 70 takes in the measurement data (STEP So9).

Then, in the output device 51, the microcontroller 70 controls the display section 56 to display the measurement data (pulse rate, movement speed) in addition to time information (time) which is updated as needed and displayed (STEP So10).

Then, in the output device 51, the microcontroller 70 controls the output device 51 to be in initial mode as in STEP So1 (STEP So11) and returns to STEP So2 to repeat the above series of processes.

According to the activity information meter in Example 1 as described above, the measuring device 1 has the first selector 14 between the current output section 12 and the first electrode 19 and the second selector 15, has the second selector 15 between the current output section 12 and the second electrode 20 and the first selector 14 and has the sixth selector 16 between the second electrode 20 and the voltage detection section 17 and the reference potential section 13 and has a reference potential in the reference potential section 13; the output device 51 has the third selector 66 between the current output section 63 and the third electrode 71 and the fourth selector 65, has the fourth selector 65 between the current output section 63 and the fourth electrode 54 (or the fifth electrode 55) and the third selector 66 and has the fifth selector 67 between the fourth electrode 54 (or the fifth electrode 55) and the voltage detection section 68 and the reference potential section 64 and has a reference potential in the reference potential section 64; when the first selector 14, the second selector 15 and the sixth selector 16 are in the connection relationship of receiving mode, the fourth selector 65, the third selector 66 and the fifth selector 67 are in the connection relationship of transmitting mode, and the output device 51 transmits control data to the measuring device 1; and when the fourth selector 65, the third selector 66 and the fifth selector 67 are in the connection relationship of receiving mode, the first selector 14, the second selector 15 and the sixth selector 16 are in the connection relationship of transmitting mode, and the measuring device 1 transmits measurement data to the output device 51. This makes the activity information meter capable of stable, bidirectional transmission which is hardly influenced by the environment and highly convenient.

In the above Example 1, the output device 51 comprises the fourth electrode 54 and the fifth electrode 55 as the transmitting electrodes 75 and the first switch 58 and the second switch 59 as the start switches 73, a pulse rate is transmitted from the measuring device 1 to the output device 51 as measurement data when a subject activates the first switch 58 by touching the fourth electrode 54, and a movement speed is transmitted from the measuring device 1 to the output device 51 as measurement data when the subject activates the second switch 59 by touching the fifth electrode 55. Further, it is possible for a subject to know only necessary, specific measurement data out of many kinds of measurement data (including body temperature and blood pressure in addition to a pulse rate and a movement speed) by increasing the number of sensors in the measuring device 1 to acquire many kinds of measurement data and increasing the numbers of the transmitting electrodes 75 and the start switches 73 in the output device 51.

EXAMPLE 2

In Example 2, an activity information meter which detects a voltage that occurs based on an impedance between body parts will be described in detail by use of FIGS. 1, 4, 5, 11 and 17. In these drawings, the constituents of the activity information meter in Example 2 which have the same forms and functions as those of the activity information meter in Example 1 are numbered with the same numbers, and the constituents of the activity information meter in Example 2 which have different forms or functions as those of the activity information meter in Example 1 are numbered with different numbers.

As in the case of the activity information meter in Example 1, the activity information meter in Example 2 is constituted by a measuring device 101 and an output device 151 which are formed separately and transmit measurement data and control data via a body as a medium and is attached to an arm 501 when used, as shown in FIG. 1.

The constitution of the measuring device 101 will be described in detail.

Figure 11:
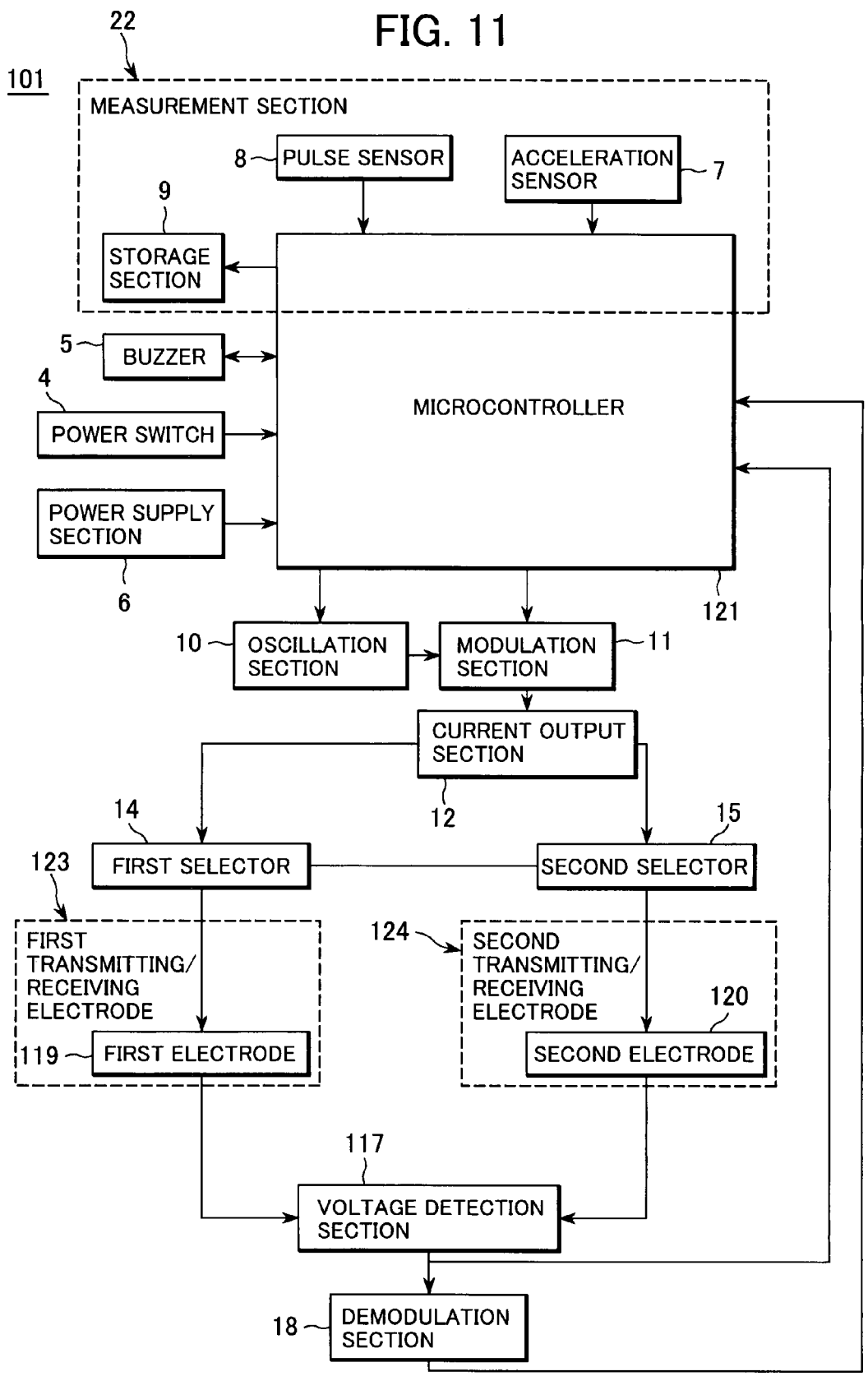
FIG. 11 is a block diagram illustrating the constitution of the measuring device in the activity information meter (Example 2).

FIG. 11 is a block diagram illustrating the constitution of the measuring device in the activity information meter as Example 2. As shown in FIG. 1 or 11, the measuring device 101 is roughly constituted by a case 2 and a band 3 which is wrapped around the left upper arm of the arm 501 to attach the case 2, measures a pulse rate and a movement speed as activity information (measurement data) and communicates with the output device 151.

The case 2 has a power switch 4 and a buzzer 5 on its external surface and also incorporates, on an electronic substrate, a power supply section 6, an acceleration sensor 7, a storage section 9, an oscillation section 10, a modulation section 11, a current output section 12, a first selector 14, a second selector 15, a voltage detection section 117, a demodulation section 18 and a microcontroller 121.

The band 3 has a first electrode 119, a second electrode 120 and a pulse sensor 8 on its arm-contacting surface.

Next, the sections provided in the case 2 and the band 3 in the measuring device 101 will be described in detail.

The power supply section 6 supplies power to the sections in the electrical system (i.e. power switch 4, buzzer 5, acceleration sensor 7, pulse sensor 8, storage section 9, oscillation section 10, modulation section 11, current output section 12, first electrode 119, second electrode 120, first selector 14, second selector 15, voltage detection section 117, demodulation section 18 and microcontroller 121).

The power switch 4 is a slide type and initiates supply of power from the power supply section 6 to the sections in the electrical system.

The buzzer 5 generates a warning sound when there is a possibility that measurement data cannot be transmitted.

The pulse sensor 8 is a piezoelectric type, and a pressure pulse wave is detected by the piezoelectric element.

The acceleration sensor 7 is a semiconductor piezoresistance type and detects acceleration when a subject 500 is in activity.

The storage section 9 stores a pulse rate determined by the microcontroller 121 based on the pressure pulse wave detected by the pulse sensor 8 and a movement speed determined by the microcontroller 121 based on the acceleration detected by the acceleration sensor 7 sequentially for each sampling. Further, the storage section 9 also stores information about computations, controls and timing performed by the microcontroller 121.

The oscillation section 10 generates an alternating current signal (e.g. carrier wave of 10 MHz).

The modulation section 11 modulates the alternating current signal generated by the oscillation section 10 into a modulated signal based on the measurement data stored in the storage section 9. More specifically, the modulation is performed such that a symbol 110 is selected in the case of a data bit 1 and a symbol 100 is selected in the case of a data bit 0, based on a combination of symbols 1 and 0 according to amplitude shift keying (ASK) of 38,400 bps. Further, the modulated signal is based on measurement data in packet form (e.g. manufacturer ID, product ID, command (44H), data length, data, check sum) issued by the microcontroller 121.

The current output section 12 outputs a current corresponding to the modulated signal modulated by the modulation section 11 (e.g. 300 mA in the case of the symbol 1, 0 mA in the case of the symbol 0). The current passed in the case of the symbol 1 is 300 mA so as to make it possible to detect it as a large signal which is hardly influenced by noise or the like without giving a harmful effect on a body.

The first electrode 119 is placed on the arm-contacting surface of the band 3 such that it is positioned closer to the shoulder when the band 3 is attached to the left upper arm. Further, the first electrode 119 is a transmitting/receiving electrode 123 and cooperates with the second electrode 120 to detect a potential which occurs in a body part where the first electrode 119 is situated when a current is passed through the body from a current output section 12 of the output device or cooperates with the second electrode 120 to pass a current output from the current output section 12 through the body.

The second electrode 120 is placed on the arm-contacting surface of the band 3 such that it is positioned closer to the elbow when the band 3 is attached to the left upper arm. Further, the second electrode 120 is a transmitting/receiving electrode 124 and detects a potential which occurs in a body part where the second electrode 120 is situated when a current is passed through the body from the current output section 12 of the output device or cooperates with the first electrode 119 to pass a current output from the current output section 12 through the body.

Figure 20B:
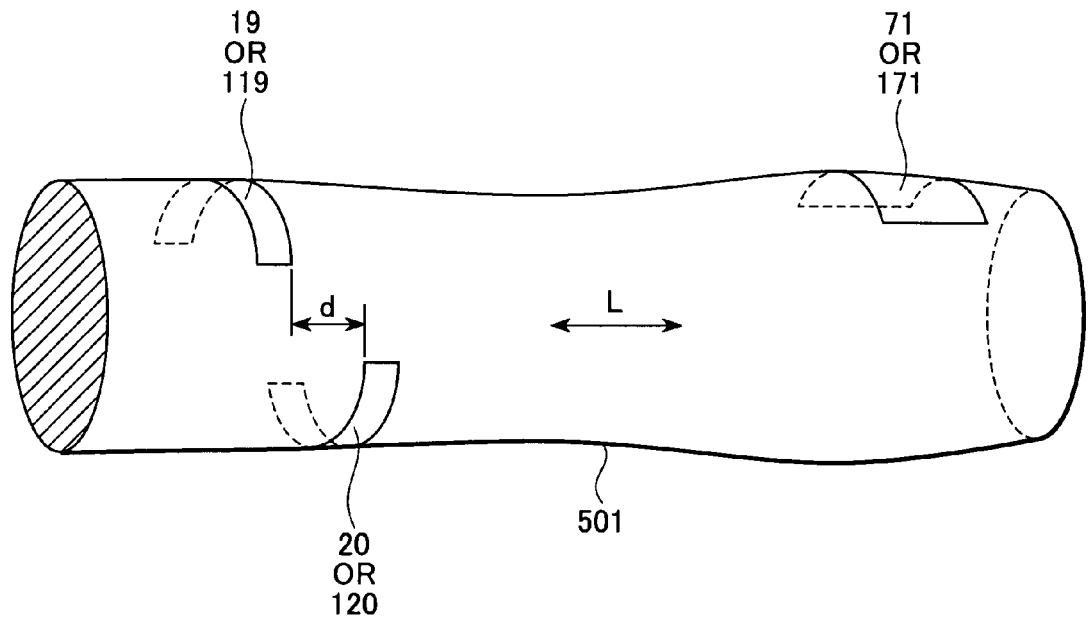

The first electrode 119 and the second electrode 120 are placed with a distance d of at least 10 mm therebetween in the direction of transmission (i.e. longitudinal direction of the arm) L, as shown in FIG. 20(*a*). This is because energization may occur due to sweating or capillaries and disturb transmission. In consideration of the size of the measuring device 1 which can be attached to the upper arm easily, the distance d between the electrodes is preferably about 30 mm.

The voltage detection section 117 detects a voltage based on the potential in the body part which has been detected by the first electrode 119 and the potential in the body part which has been detected by the second electrode 120.

The demodulation section 18 demodulates the voltage detected by the voltage detection section 17 into a demodulated signal.

The first selector 14 selects connection between the current output section 12 and the first electrode 119 or connection between the current output section 12 and the second selector 15.

The second selector 15 selects connection between the current output section 12 and the second electrode 120 or connection between the current output section 12 and the first selector 14.

The microcontroller 121 comprises a storage section, a timing section, a computation section and a control section and performs processes such as controls associated with various computations, determinations and storages including the following i) to v).

i) It controls the pulse sensor 8 to detect a pressure pulse wave, computes a pulse rate based on the detected pressure pulse wave and controls the storage section 9 to store the computed pulse rate as measurement data.

ii) It controls the acceleration sensor 7 to detect an acceleration, computes a movement speed based on the detected acceleration and controls the storage section 9 to store the computed movement speed as measurement data.

iii) It controls the oscillation section 10 to generate an alternating current signal when receiving control data (data requesting transmission of measurement data or data for performing various controls for the measuring device).

iv) It issues measurement data to the modulation section 11. The measurement data is issued in packet form (e.g. manufacturer ID, product ID, command (44H), data length, data, check sum).

v) When it receives control data (i.e. when it is in receiving mode), it controls the first selector 14 to select connection between the current output section 12 and the second selector 15 and controls the second selector 15 to select connection between the current output section 12 and the first selector 14. Meanwhile, when it transmits measurement data (i.e. when it is in transmitting mode), it controls the first selector 14 to select connection between the current output section 12 and the first electrode 119 and controls the second selector 15 to select connection between the current output section 12 and the second electrode 120.

The above pulse sensor 8, acceleration sensor 7, storage section 9 and microcontroller 121 constitute a measurement section 22 which measures a pulse rate and a movement speed as activity information.

Next, the constitution of the output device 151 will be described in detail.

Figure 12:
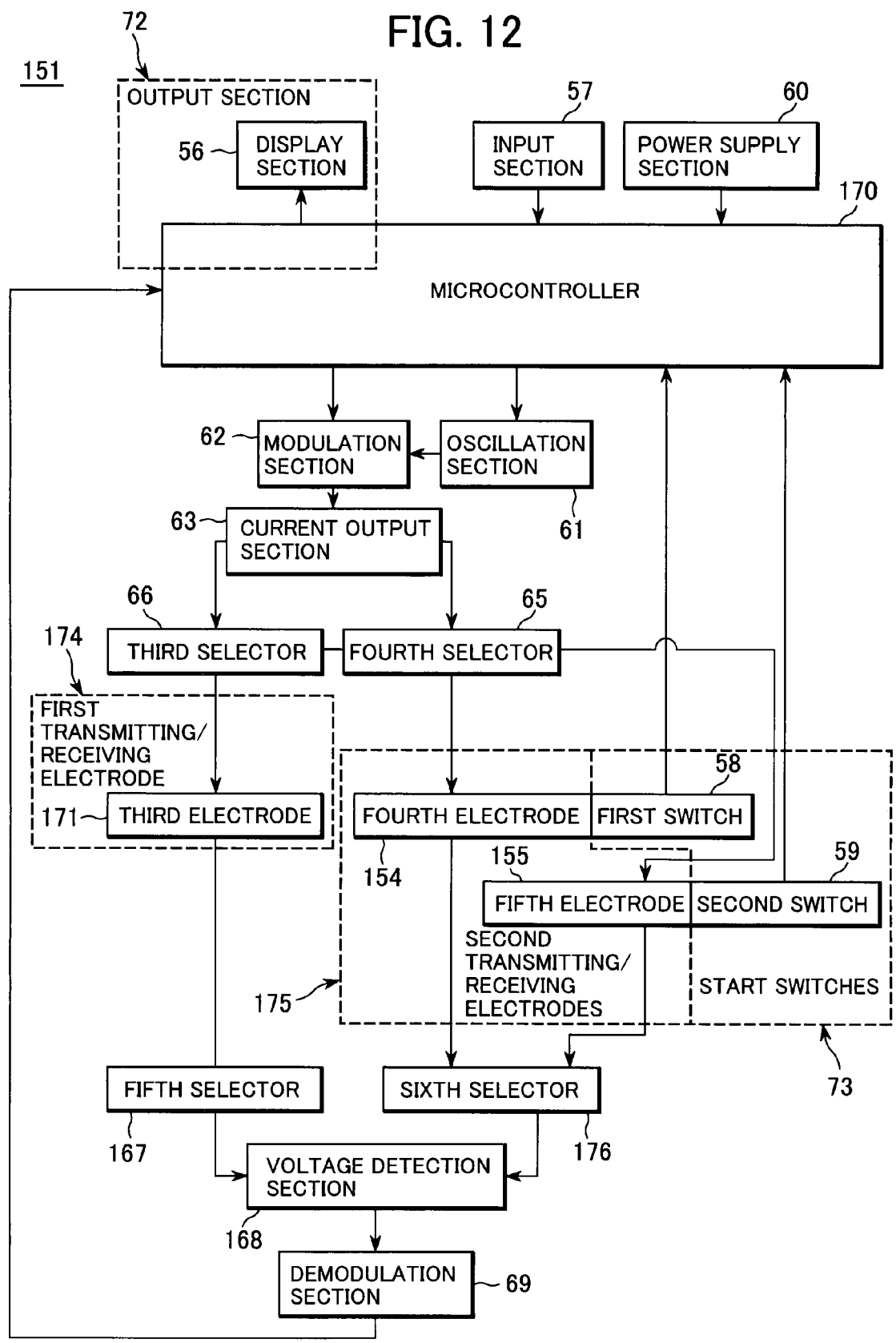
FIG. 12 is a block diagram illustrating the constitution of the output device in the activity information meter (Example 2).

FIG. 12 is a block diagram illustrating the constitution of the output device in the activity information meter as Example 2. As shown in FIG. 1 or 12, the output device 151 is roughly constituted by a case 52 and a band 53 which is wrapped around the left wrist of the arm 501 to attach the case 52, normally displays time information, and acquires a pulse rate and a movement speed as activity information by transmission and displays them when the subject 500 desires to know the information.

The case 52 has an input section 57, a display section 56, a fourth electrode 154, a fifth electrode 155, a first switch 58 and a second switch 59 on its external surface and also incorporates, on an electronic substrate, a power supply section 60, an oscillation section 61, a modulation section 62, a current output section 63, a third selector 66, a fourth selector 65, a fifth selector 167, a sixth selector 176, a voltage detection section 168, a demodulation section 69 and a microcontroller 170.

The band 53 has a third electrode 171 on its arm-contacting surface.

Next, the sections provided in the case 52 and the band 53 in the output device 151 will be described in detail.

The power supply section 60 supplies power to the sections in the electrical system (i.e. input section 57, display section 56, oscillation section 61, modulation section 62, current output section 63, third electrode 171, fourth electrode 154, fifth electrode 155, first switch 58, second switch 59, third selector 66, fourth selector 65, fifth selector 167, sixth selector 176, voltage detection section 168, demodulation section 69 and microcontroller 170).

The input section 57 comprises four switches and inputs time information (time).

The display section 56 comprises an LCD (Liquid Crystal Display) and displays time information (time) and measurement data (pulse rate or movement speed).

The oscillation section 61 generates an alternating current signal (e.g. carrier wave of 10 MHz).

The modulation section 62 modulates the alternating current signal generated by the oscillation section 61 into a modulated signal based on control data. More specifically, the modulation is performed such that a symbol 110 is selected in the case of a data bit 1 and a symbol 100 is selected in the case of a data bit 0, based on a combination of symbols 1 and 0 according to amplitude shift keying of 38,400 bps. Further, the modulated signal is based on control data in packet form (e.g. manufacturer ID, product ID, command (44H), data length (01H), data (01H, 02H), check sum) issued by the microcontroller 170.

The current output section 63 outputs a current corresponding to the modulated signal modulated by the modulation section 62 (e.g. 300 mA in the case of the symbol 1, 0 mA in the case of the symbol 0).

The third electrode 171 is placed on the wrist-contacting surface of the band 53 when the band 53 is attached to the left wrist. Further, the third electrode 171 is a first transmitting/receiving electrode 174 and detects a potential which occurs in a body part where the third electrode 171 is situated when a current is passed through a body from the current output section 63 of the measuring device or cooperates with the fourth electrode 154 or the fifth electrode 155 to pass a current output from the current output section 63 through the body.

The fourth electrode 154 and the fifth electrode 155 are placed (on spots which do not contact the wrist) on the display surface of the band 53 when the band 53 is attached to the wrist. Further, the fourth electrode 154 and the fifth electrode 155 are second transmitting/receiving electrodes 175 and detect a potential which occurs in a body part where the fourth or fifth electrode is situated when a current is passed through a body from the current output section 63 of the measuring device or cooperate with the third electrode 171 to pass a current output from the current output section 63 through the body.

The first switch 58 is situated under the fourth electrode 154 and activated when the right hand of the subject 500 touches the fourth electrode 154. The second switch 59 is situated under the fifth electrode 155 and activated when the right hand of the subject 500 touches the fifth electrode 155.

The voltage detection section 168 detects a voltage based on the potential in the body part which has been detected by the third electrode 171 and the potential in the body part which has been detected by the fourth electrode 154 and the fifth electrode 155.

The demodulation section 69 demodulates the voltage detected by the voltage detection section 168 into a demodulated signal.

The third selector 66 selects connection between the current output section 63 and the third electrode 171 or connection between the current output section 63 and the fourth selector 65.

The fourth selector 65 selects connection between the current output section 63 and the fourth electrode 154 or the fifth electrode 155 or connection between the current output section 63 and the third selector 66.

The fifth selector 167 selects connection between the third electrode 171 and the voltage detection section 168 or connection between the third electrode 171 and the sixth selector 176.

The sixth selector 176 selects connection between the fourth electrode 154 or the fifth electrode 155 and the voltage detection section 168 or connection between the fourth electrode 154 or the fifth electrode 155 and the fifth selector 167.

The microcontroller 170 comprises a storage section, a timing section, a computation section and a control section and performs processes such as controls associated with various inputs, computations, determinations, storages and displays including the following i) to v).

i) It controls the oscillation section 61 to generate an alternating current signal when receiving measurement data.

ii) It determines which one of the first switch 58 and the second switch 59 has been activated and issues control data (data requesting transmission of measurement data or data for performing various controls for the measuring device) to the modulation section 62. The control data is issued in packet form (e.g. manufacturer ID, product ID, command (44H), data length (01H), data (01H, 02H), check sum, in the case of the data requesting transmission of measurement data). The data is 01H (data indicating a request for a pulse rate) when the first switch 58 has been activated and 02H (data indicating a request for a movement speed) when the second switch 59 has been activated.

iii) When it does not transmit or receive measurement data and control data (i.e. when it is in initial mode), it controls the third selector 66 to select connection between the current output section 63 and the fourth selector 65, controls the fourth selector 65 to select connection between the current output section 63 and the third selector 66, controls the fifth selector 167 to select connection between the sixth selector 176 and the voltage detection section 168 and controls the sixth selector 176 to select connection between the fifth selector 167 and the voltage detection section 168. Meanwhile, when it transmits control data (i.e. when it is in transmitting mode), it controls the third selector 66 to select connection between the current output section 63 and the third electrode 171, controls the fourth selector 65 to select connection between the current output section 63 and the fourth electrode 154 or the fifth electrode 155, controls the fifth selector 167 to select connection between the third electrode 171 and the voltage detection section 168 and controls the sixth selector 176 to select connection between the fourth electrode 154 or the fifth electrode 155 and the voltage detection section 168. Meanwhile, when it receives measurement data (i.e. when it is in receiving mode), it controls the third selector 66 to select connection between the current output section 63 and the fourth selector 65, controls the fourth selector 65 to select connection between the current output section 63 and the third selector 66, controls the fifth selector 167 to select connection between the third electrode 171 and the voltage detection section 168 and controls the sixth selector 176 to select connection between the fourth electrode 154 or the fifth electrode 155 and the voltage detection section 168.

iv) It sets time information (time) based on time information (time) input from the input section 57 and updates the time information (time) according to passage of time timed by the timing section as needed.

v) It controls the display section 56 to display the above timed time information (time) and measurement data (pulse rate or movement speed) transmitted from the measuring device 101.

The display section 56 and the microcontroller 170 constitute an output section 72 which outputs measurement data corresponding to the demodulated signal demodulated by the demodulation section 69. Further, the first switch 58 and the second switch 59 constitute a start switch 73 which is activated when another end part (right hand) of a body touches the second transmitting/receiving electrode 175 (fourth electrode 154 or fifth electrode 155).

Figure 13:
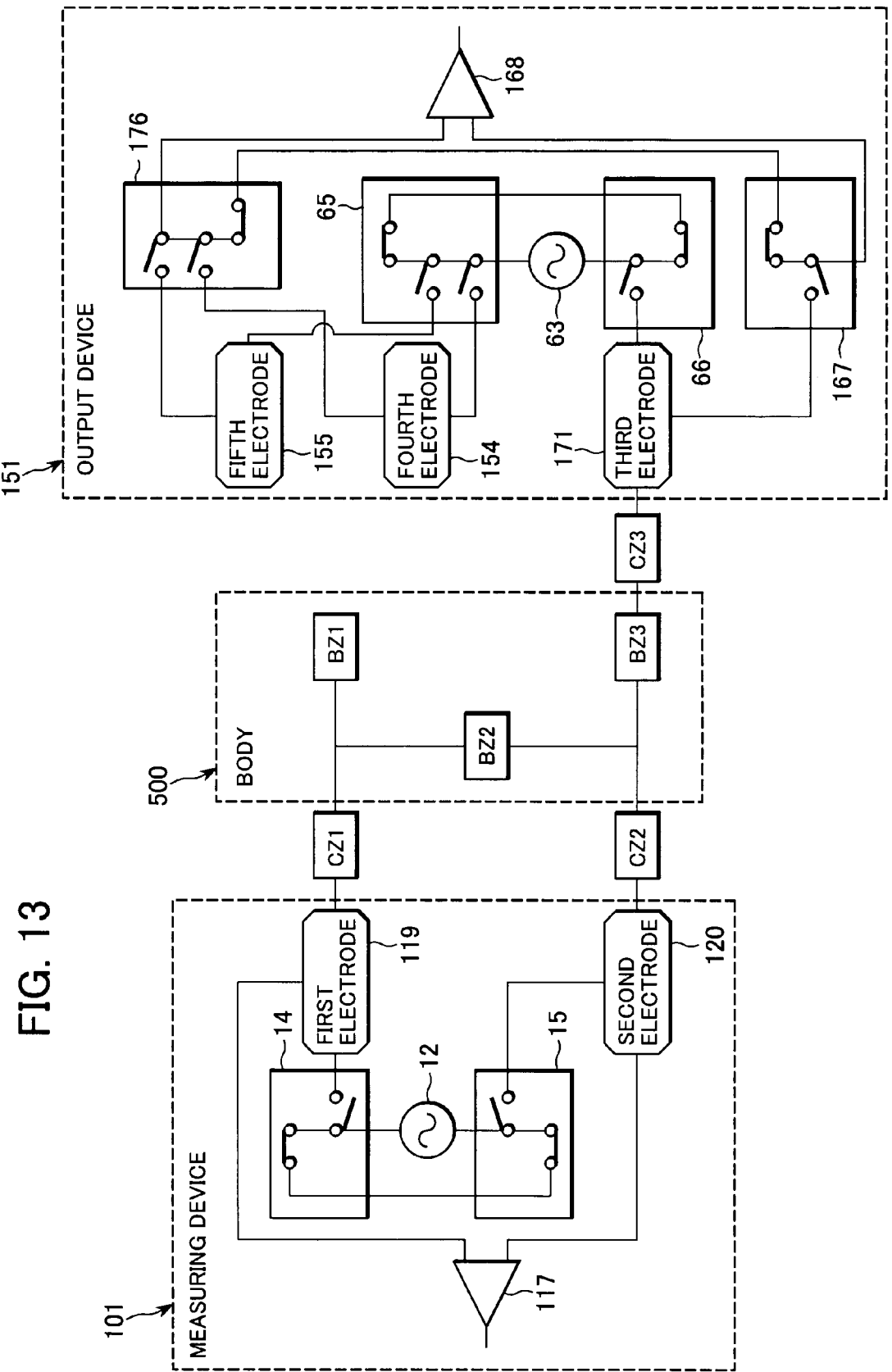
FIG. 13 is an equivalent circuit diagram illustrating a state when no data is transmitted between the measuring device and the output device electrically (Example 2).
Figure 14A:
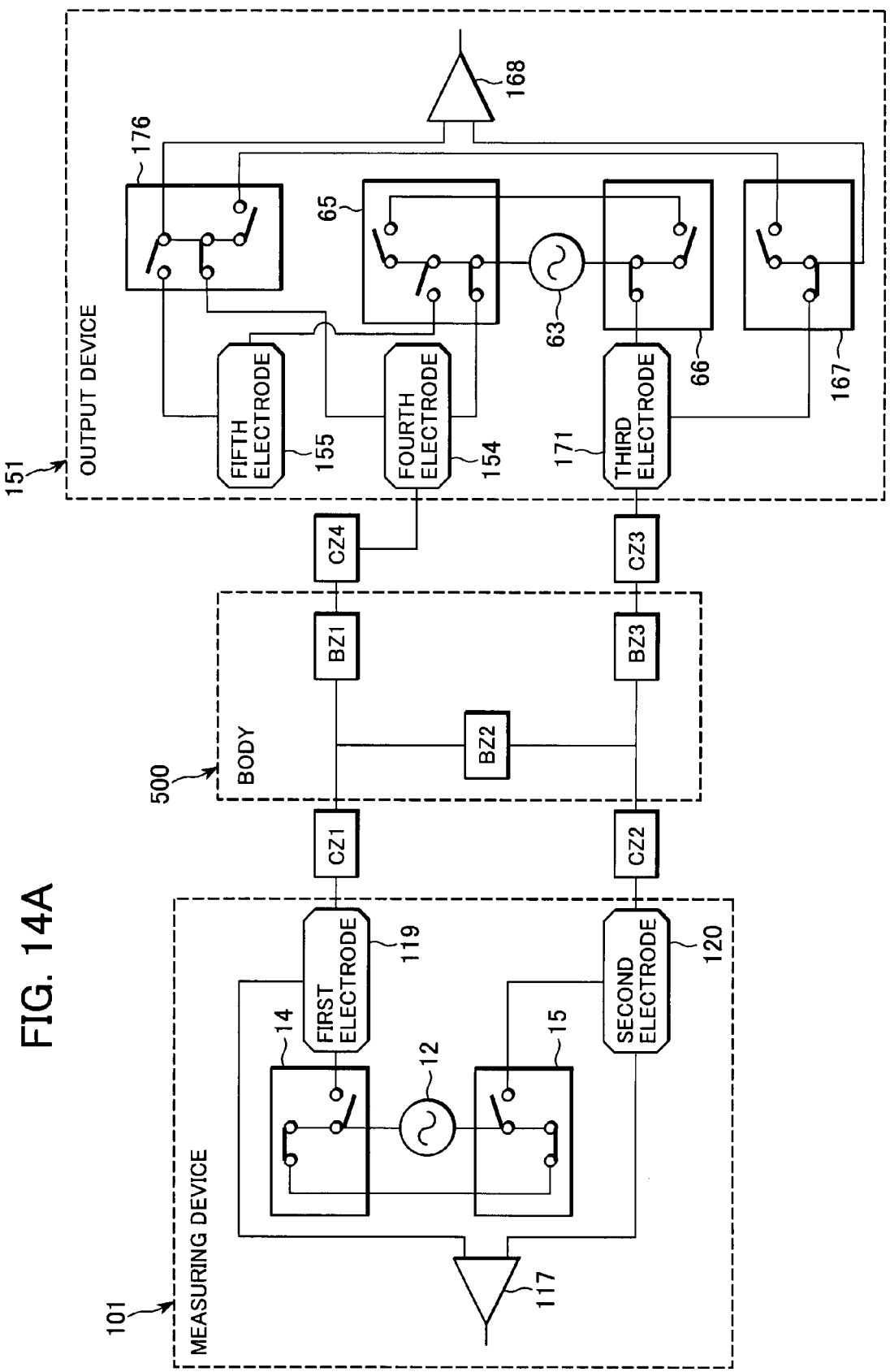
FIG. 14 is equivalent circuit diagrams illustrating a state when control data is transmitted from the output device to the measuring device electrically, wherein (a) illustrates a state when a fourth electrode 54 is selected to request a pulse rate as measurement data, and (b) illustrates a state when a fifth electrode 55 is selected to request a movement speed as measurement data (Example 2).
Figure 14B:
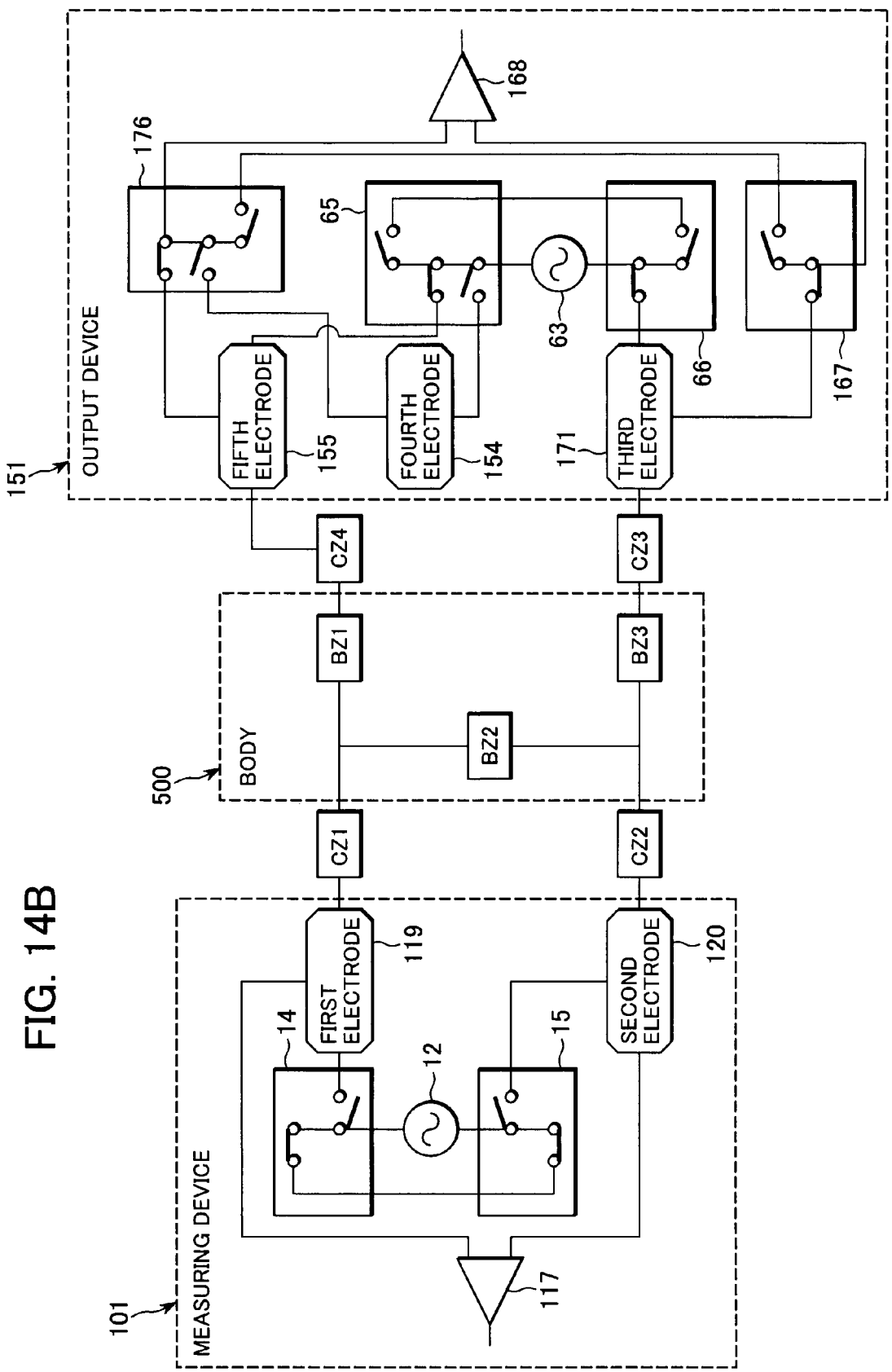
Figure 15A:
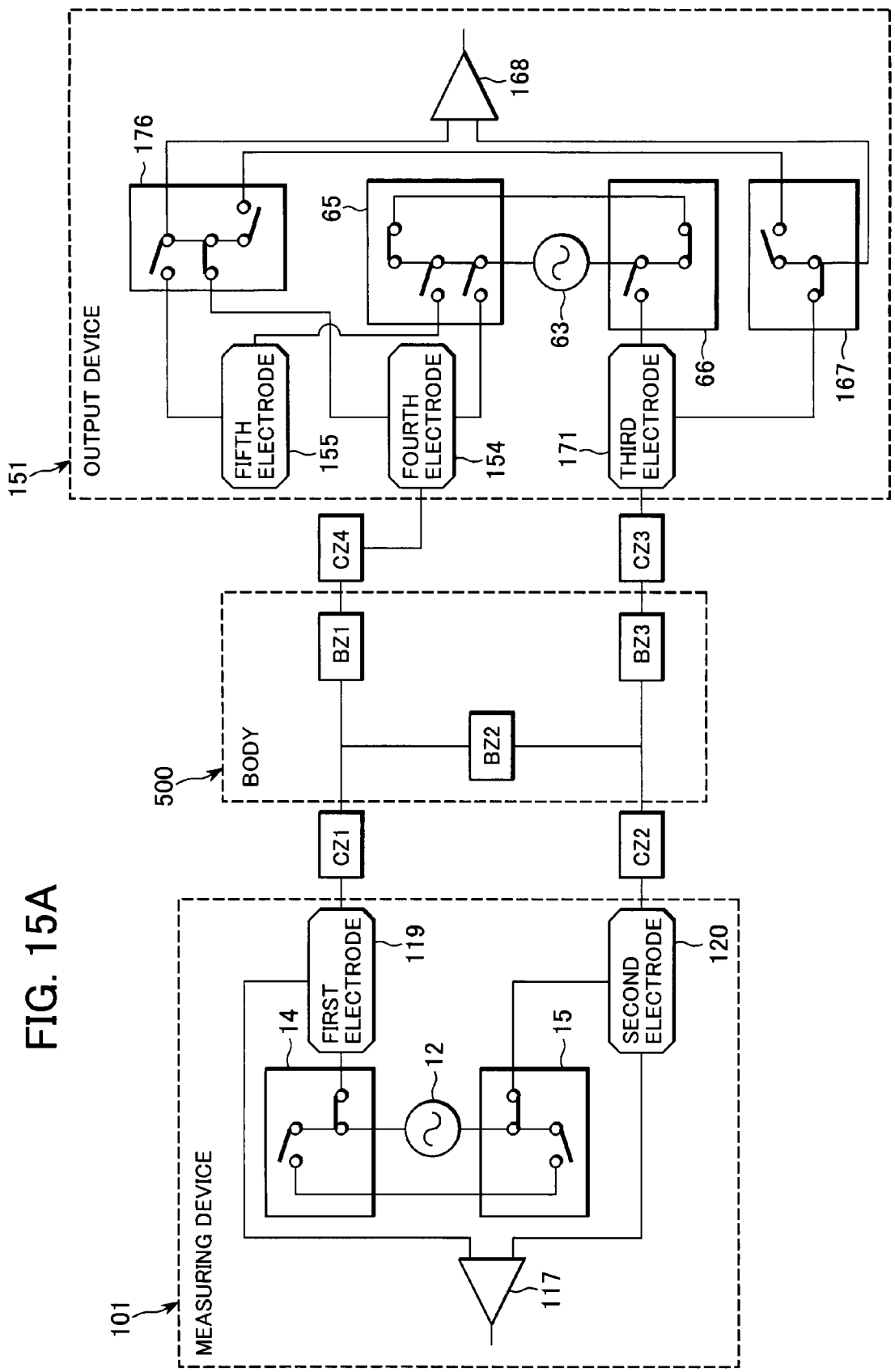
FIG. 15 is equivalent circuit diagrams illustrating a state when measurement data is transmitted from the measuring device to the output device electrically (Example 2).
Figure 15B:
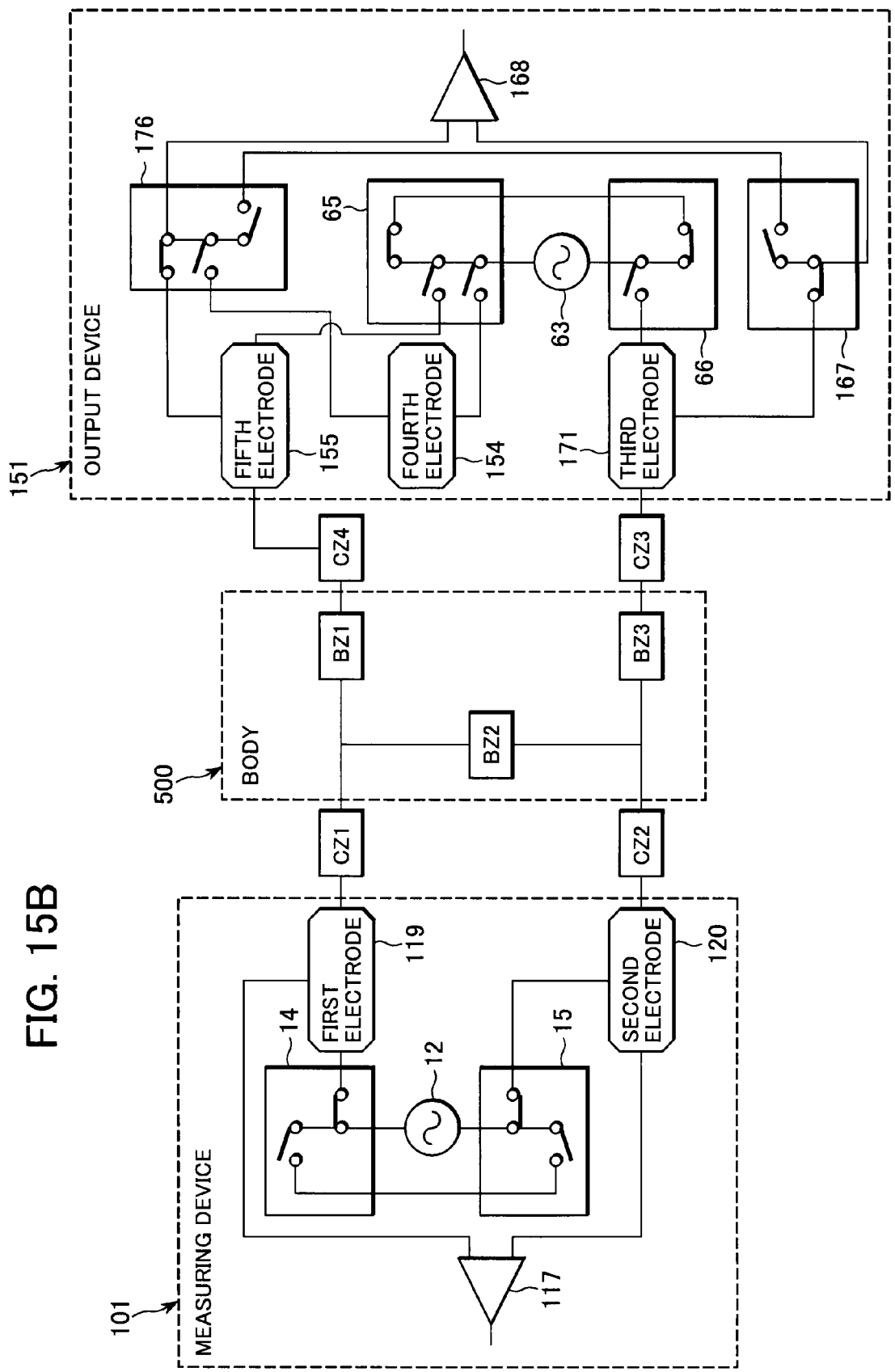
Figure 16B:
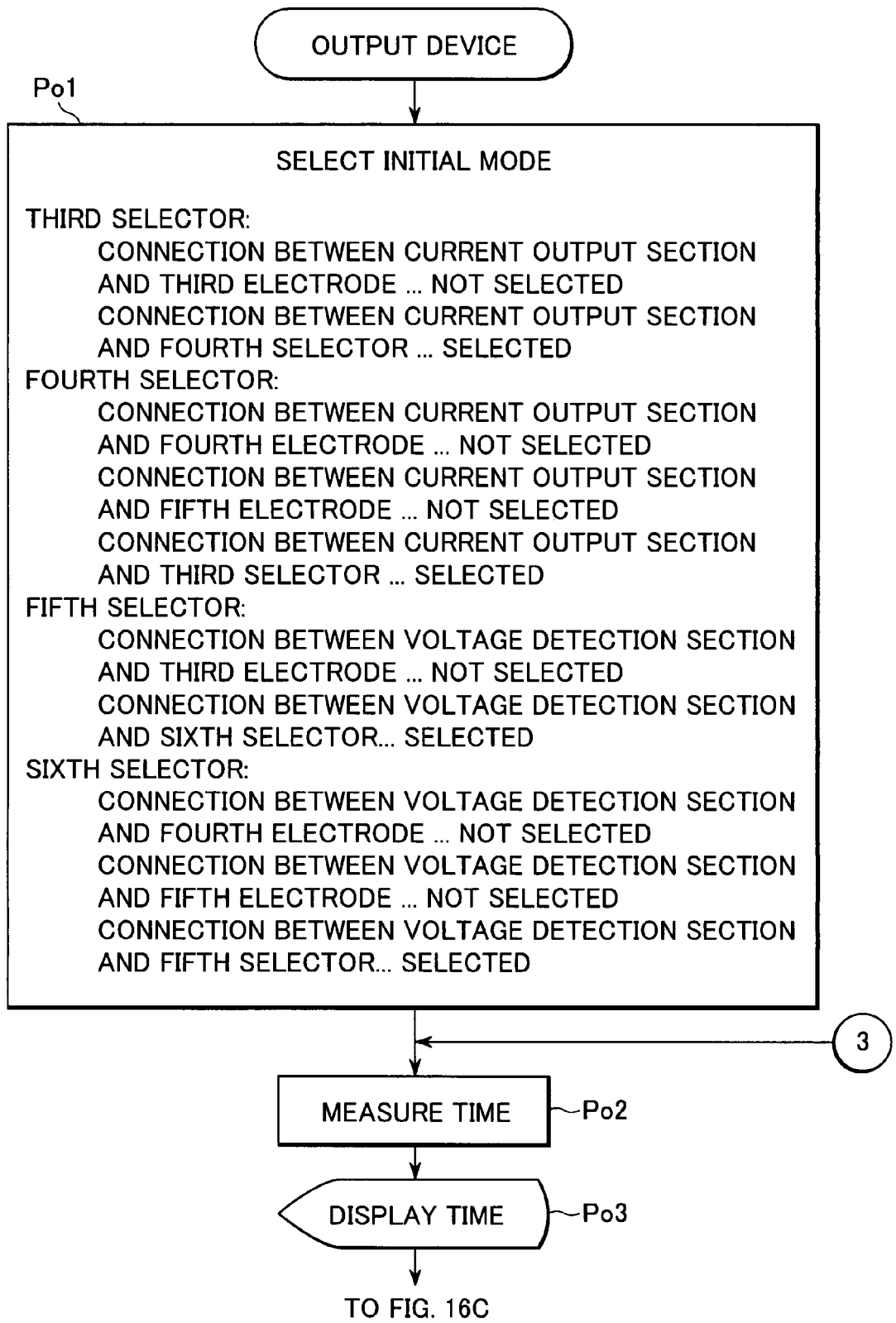
FIG. 16 (16A, 16B and 16C) is a flowchart illustrating a flow (first half) of the operations of the activity information meter (Example 2).
Figure 17A:
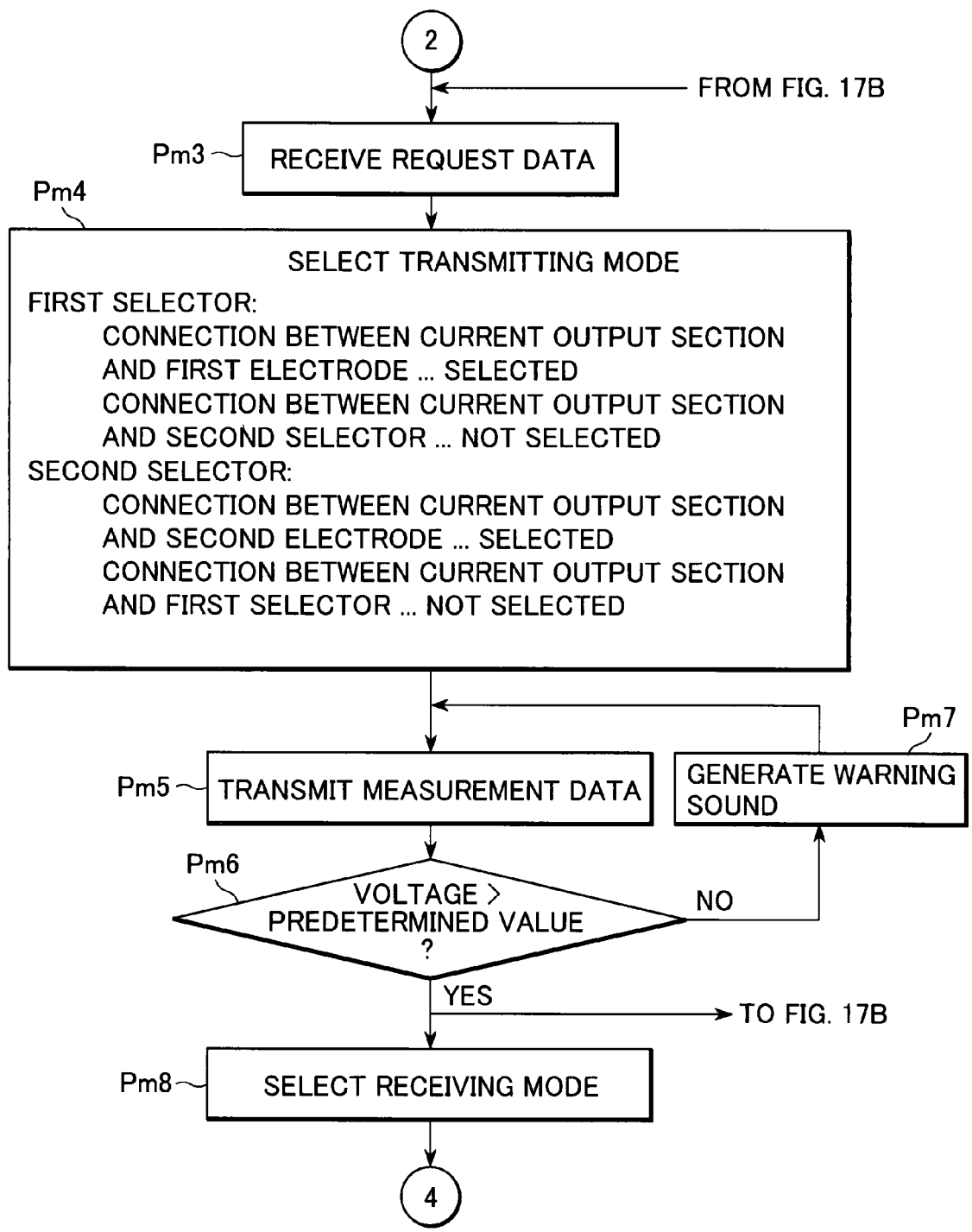
FIG. 17 (17A and 17B) is a flowchart illustrating a flow (second half) of the operations of the activity information meter (Example 2).
Figure 17B:
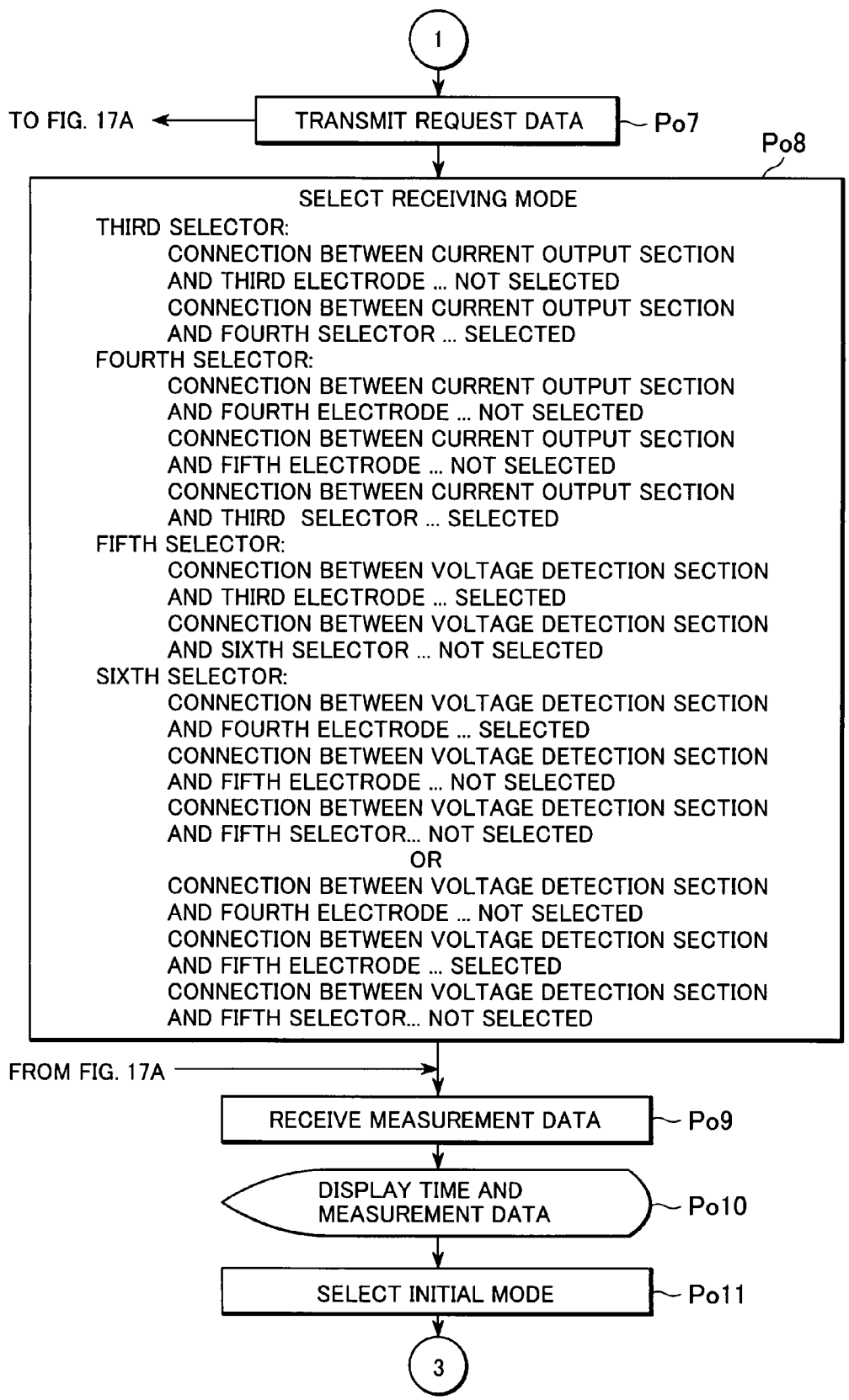

Next, FIG. 16 (16A, 16B and 16C) is a flowchart illustrating a flow (first half) of the operations of the activity information meter as Example 2. FIG. 17 (17A and 17B) is a flowchart illustrating a flow (second half) of the operations of the activity information meter as Example 1. FIG. 4 is a diagram illustrating the posture of a body when no data is transmitted between the measuring device 101 and the output device 151. FIG. 5 is a diagram illustrating the posture of a body when data is transmitted between the measuring device 101 and the output device 151. FIG. 13 is an equivalent circuit diagram illustrating a state when no data is transmitted between the measuring device 101 and the output device 151 electrically. FIG. 14 is equivalent circuit diagrams illustrating a state when control data is transmitted from the output device 151 to the measuring device 101 electrically, wherein (a) illustrates a state when the fourth electrode is selected to request a pulse rate as measurement data, and (b) illustrates a state when the fifth electrode is selected to request a movement speed as measurement data. FIG. 15 is equivalent circuit diagrams illustrating a state when measurement data is transmitted from the measuring device 101 to the output device 151 electrically, wherein (a) illustrates a state when a pulse rate is transmitted as measurement data and (b) illustrates a state when a movement speed is transmitted as measurement data.

In FIGS. 13, 14 and 15, BZ3 represents an impedance between the left wrist (one end part of a body) on which the third electrode 171 (first transmitting/receiving electrode 174) is placed and a part of the left upper arm which is closer to the elbow and on which the second electrode 120 (transmitting/receiving electrode 124) is placed. BZ2 represents an impedance between the part of the left upper arm which is closer to the elbow and on which the second electrode 120 (transmitting/receiving electrode 124) is placed and a part of the left upper arm which is closer to the shoulder and on which the first electrode 119 (transmitting/receiving electrode 123) is placed. BZ1 represents an impedance between the part of the left upper arm which is closer to the shoulder and on which the first electrode 119 (transmitting/receiving electrode 123) is placed and the right hand (another end part of the body) on which the fourth electrode 154 or the fifth electrode 155 is placed. CZ1 represents a contact impedance which occurs between the first electrode 119 and the part of the left upper arm which is closer to the shoulder. CZ2 represents a contact impedance which occurs between the second electrode 120 and the part of the left upper arm which is closer to the elbow. CZ3 represents a contact impedance which occurs between the third electrode 171 and the left wrist (one end part of the body). CZ4 represents a contact impedance which occurs between the fourth electrode 154 or the fifth electrode 155 and the right hand (another end part of the body).

The activity information meter in Example 2 operates in accordance with the flow illustrated in FIGS. 16 (16A, 16B and 16C) and 17 (17A and 17B).

First, as shown in FIG. 1, the subject 500 attaches the measuring device 101 and the output device 151 to the left upper arm and the left wrist, respectively. Then, in the measuring device 101, when the power switch 4 is pressed, the power supply section 6 supplies power to the sections in the electrical system. Then, the microcontroller 121 controls the measuring device 101 to be in receiving mode so that the measuring device 101 receives control data from the output device 151. More specifically, the microcontroller 121 controls the first selector 14 to select connection between the current output section 12 and the second selector 15 and controls the second selector 15 to select connection between the current output section 12 and the first selector 14 (STEP Pm1).

Then, in the measuring device 101, the measurement section 22 measures a pulse rate and a movement speed. More specifically, the pulse sensor 8 detects a pressure pulse wave, the microcontroller 121 computes a pulse rate based on the detected pressure pulse wave, and the storage section 9 stores the computed pulse rate. Further, the acceleration sensor 7 detects acceleration, the microcontroller 121 computes a movement speed based on the detected acceleration, and the storage section 9 stores the computed movement speed. The microcontroller 121 controls the pulse sensor 8, the acceleration sensor 7 and the storage section 9 to perform the above series of processes for measurements of the pulse rate and the movement speed at a predetermined time interval. Further, the microcontroller 121 monitors reception of control data from the output device 151 (i.e. a voltage between the first electrode 119 and the second electrode 120) (STEP Pm2).

Meanwhile, in the output device 151, the power supply section 60 supplies power to the sections in the electrical system. Then, the microcontroller 170 controls the output device 151 to be in initial mode so that the output device 151 neither transmits nor receives measurement data and control data. More specifically, the microcontroller 170 controls the third selector 66 to select connection between the current output section 63 and the fourth selector 65, controls the fourth selector 65 to select connection between the current output section 63 and the third selector 66, controls the fifth selector 67 to select connection between the sixth selector 176 and the voltage detection section 168 and controls the sixth selector 176 to select connection between the fifth selector 67 and the voltage detection section 168 (STEP Po1).

Then, in the output device 151, the microcontroller 170 times elapsed time and updates time information (time) according to the elapsed time as needed (STEP Po2), and the display section 56 displays the time information (time) updated as needed (STEP Po3). If desired, time information (time) can be input through the input section 57 to correct setting of the time information (time).

Then, in the output device 151, the microcontroller 170 determines which one of the first switch 58 and the second switch 59 has been activated (STEP Po4). When the subject 500 has activated the first switch 58 by touching the fourth electrode 154 by the right hand as shown in FIG. 5 (first switch in STEP Po4), the microcontroller 170 controls the third selector 66 to select connection between the current output section 63 and the third electrode 171, controls the fourth selector 65 to select connection between the current output section 63 and the fourth electrode 154, controls the fifth selector 167 to select connection between the third electrode 171 and the voltage detection section 168 and controls the sixth selector 176 to select connection between the fourth electrode 154 and the voltage detection section 168 as shown in FIG. 14(a) (STEP Po5). Meanwhile, when the subject 500 has activated the second switch 59 by touching the fifth electrode 155 by the right hand (second switch in STEP Po4), the microcontroller 170 controls the third selector 66 to select connection between the current output section 63 and the third electrode 171, controls the fourth selector 65 to select connection between the current output section 63 and the fifth electrode 155, controls the fifth selector 167 to select connection between the third electrode 171 and the voltage detection section 168 and controls the sixth selector 176 to select connection between the fifth electrode 155 and the voltage detection section 168 as shown in FIG. 14(b) (STEP Po6).

Then, in the output device 151, the oscillation section 61 generates an alternating current signal (e.g. carrier wave of 10 MHz). Further, together with this, the microcontroller 170 issues control data (data requesting transmission of measurement data) to the modulation section 62 in packet form (e.g. manufacturer ID, product ID, command (44H), data length (01H), data (01H), check sum) when the first switch 58 has been activated or in packet form (e.g. manufacturer ID, product ID, command (44H), data length (01H), data (02H), check sum) when the second switch 59 has been activated. Then, the modulation section 62 modulates the alternating current signal generated by the oscillation section 61 into a modulated signal based on the control data (that is, a symbol 110 is selected in the case of a data bit 1 and a symbol 100 is selected in the case of a data bit 0, based on a combination of symbols 1 and 0 according to amplitude shift keying of 38,400 bps). Then, the current output section 63 outputs a current corresponding to the modulated signal modulated by the modulation section 62 (e.g. 300 mA in the case of the symbol 1, 0 mA in the case of the symbol 0) (STEP Po7). As a result, the current passes through a body part between the third electrode 171 and the fourth electrode 154 (i.e. between the left wrist and the right hand) when the first switch 58 has been activated, while the current passes through a body part between the third electrode 171 and the fifth electrode 155 (i.e. between the left wrist and the right hand) when the second switch 59 has been activated.

Then, in the output device 151, the microcontroller 170 controls the third selector 66 to select connection between the current output section 63 and the fourth selector 65, controls the fourth selector 65 to select connection between the current output section 63 and the third selector 66 and controls the fifth selector 67 to select connection between the third electrode 171 and the voltage detection section 168 as shown in FIG. 15 (STEP Po8).

Meanwhile, in the measuring device 101, the first electrode 119 and the second electrode 120 detect a potential which occurs in body parts where the first electrode 119 and the second electrode 120 are situated, respectively. Then, the voltage detection section 117 detects a potential difference which occurs in the body parts where the first electrode 119 and the second electrode 120 are situated. In other words, the voltage detection section 117 detects a voltage based on the potential in the body part which has been detected by the first electrode 119 and the potential in the body part which has been detected by the second electrode 120. When the current passed through the body is I, a voltage of I×BZ2 is generated between the first electrode 119 and the second electrode 120. Then, the demodulation section 18 demodulates the voltage detected by the voltage detection section 117 into a demodulated signal (control data). Then, the microcontroller 121 takes in the control data (STEP Pm3).

Then, in the measuring device 101, the microcontroller 121 controls the first selector 14 to select connection between the current output section 12 and the first electrode 119 and controls the second selector 15 to select connection between the current output section 12 and the second electrode 120 as shown in FIG. 17 (17A and 17B) (STEP Pm4).

Then, in the measuring device 101, the oscillation section 61 generates an alternating current signal (e.g. carrier wave of 10 MHz). Further, together with this, the microcontroller 121 issues measurement data to the modulation section 11 in packet form (e.g. manufacturer ID, product ID, command (44H), data length, data, check sum) in accordance with the control data taken in the measuring device 101. Then, the modulation section 11 modulates the alternating current signal generated by the oscillation section 10 into a modulated signal based on the measurement data (that is, a symbol 110 is selected in the case of a data bit 1 and a symbol 100 is selected in the case of a data bit 0, based on a combination of symbols 1 and 0 according to amplitude shift keying of 38,400 bps). Then, the current output section 12 constantly outputs a current corresponding to the modulated signal modulated by the modulation section 11 (e.g. 300 mA in the case of the symbol 1, 0 mA in the case of the symbol 0) (STEP Pm5). As a result, the current constantly passes through a body part between the first electrode 119 and the second electrode 120 (i.e. between the part of the left upper arm which is closer to the elbow and the part of the left upper arm which is closer to the shoulder).

Then, in the measuring device 101, the first electrode 119 and the second electrode 120 detect a potential which occurs in the body parts where the first electrode 119 and the second electrode 120 are situated, respectively. Then, the voltage detection section 117 detects a potential difference which occurs in the body parts where the first electrode 119 and the second electrode 120 are situated. In other words, the voltage detection section 117 detects a voltage based on the potential in the body part which has been detected by the first electrode 119 and the potential in the body part which has been detected by the second electrode 120. Then, the microcontroller 121 determines the size of the voltage detected by the voltage detection section 117 (STEP Pm6).

When the size of the detected voltage is lower than a predetermined value (NO in STEP Pm6), the microcontroller 121 controls the buzzer 5 to emit a warning sound and returns to STEP Pm5 (STEP Pm7). Meanwhile, when the size of the detected voltage is equal to or higher than the predetermined value (YES in STEP Pm6), the microcontroller 121 controls the measuring device 1 to be in receiving mode as in STEP Pm1 (STEP Pm8) and returns to STEP Pm2 to repeat the above series of processes.

Meanwhile, in the output device 151, when the subject 500 activates the first switch 58 by touching the fourth electrode 154 by the right hand, activates the first switch 58 by touching the fifth electrode 155 by the right hand or activates the input section 57 by the right hand, the third electrode 171 and the fourth electrode 154 or the third electrode 171 and the fifth electrode 155 detect a potential which occurs in body parts where the third electrode 171 and the fourth electrode 154 or the third electrode 171 and the fifth electrode 155 are situated. Then, the voltage detection section 168 detects a potential difference which occurs in the body parts where the third electrode 171 and the fourth electrode 154 or the third electrode 171 and the fifth electrode 155 are situated. In other words, the voltage detection section 117 detects a voltage based on the potential in the body part which has been detected by the third electrode 171 and the potential which has occurred in the body part where the fourth electrode 154 or the fifth electrode 155 is situated. Then, the demodulation section 69 demodulates the voltage detected by the voltage detection section 168 into a demodulated signal (measurement data). Then, the microcontroller 170 takes in the measurement data (STEP Po9).

Then, in the output device 151, the microcontroller 170 controls the display section 56 to display the measurement data (pulse rate, movement speed) in addition to time information (time) which is updated as needed and displayed (STEP Po10).

Then, in the output device 151, the microcontroller 170 controls the output device 51 to be in initial mode as in STEP Po1 (STEP Po11) and returns to STEP Po2 to repeat the above series of processes.

According to the activity information meter in Example 2 as described above, the measuring device 101 has the first selector 14 between the current output section 12 and the first electrode 119 and the second selector 15 and has the second selector 15 between the current output section 12 and the second electrode 120 and the first selector 14; the output device 151 has the third selector 66 between the current output section 63 and the third electrode 171 and the fourth selector 65, has the fourth selector 65 between the current output section 63 and the fourth electrode 154 (or the fifth electrode 155) and the third selector 66, has the fifth selector 167 between the third electrode 171 and the voltage detection section 168 and the sixth selector 176 and has the sixth selector 176 between the fourth electrode 154 (or the fifth electrode 155) and the voltage detection section 168 and the fifth selector 167; when the first selector 14 and the second selector 15 are in the connection relationship of receiving mode, the third selector 66, the fourth selector 65, the fifth selector 167 and the sixth selector 176 are in the connection relationship of transmitting mode, and the output device 151 transmits control data to the measuring device 101; and when the third selector 66, the fourth selector 65, the fifth selector 167 and the sixth selector 176 are in the connection relationship of receiving mode, the first selector 14 and the second selector 15 are in the connection relationship of transmitting mode, and the measuring device 101 transmits measurement data to the output device 151. This makes the activity information meter capable of stable, bidirectional transmission which is hardly influenced by the environment and highly convenient.

In the above Example 2, the output device 151 comprises the fourth electrode 154 and the fifth electrode 155 as the second transmitting/receiving electrodes 175 and the first switch 58 and the second switch 59 as the start switches 73, a pulse rate is transmitted from the measuring device 101 to the output device 151 as measurement data when a subject activates the first switch 58 by touching the fourth electrode 154, and a movement speed is transmitted from the measuring device 101 to the output device 151 as measurement data when the subject activates the second switch 59 by touching the fifth electrode 155. Further, it is possible for a subject to know only necessary, specific measurement data out of many kinds of measurement data (including body temperature and blood pressure in addition to a pulse rate and a movement speed) by increasing the number of sensors in the measuring device 101 to acquire many kinds of measurement data and increasing the numbers of the second transmitting/receiving electrodes 175 and the start switches 73 in the output device 151.

Examples of the activity information meter according to the present invention have been described above.

Figure 18A:
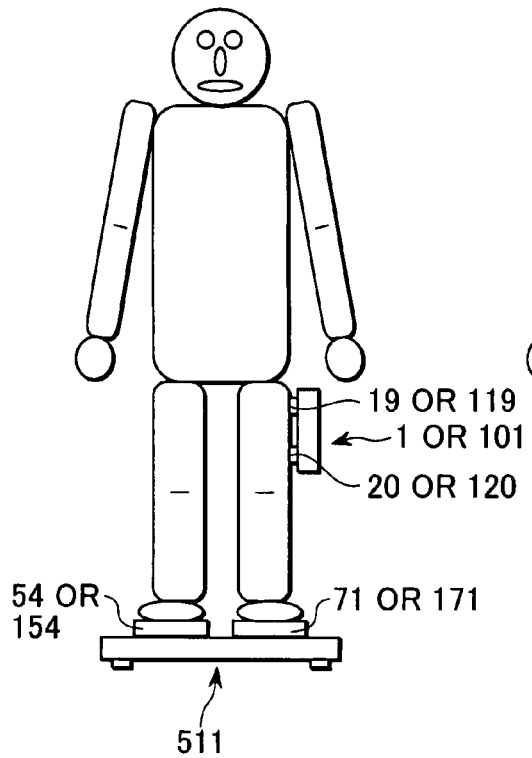
FIG. 18 is variations of the activity information meter of Example 1 or 2, wherein (a) is a diagram illustrating the posture of a body when an activity information meter in which both feet and a leg contact electrodes is used, (b) is a diagram illustrating the posture of a body when an activity information meter in which a foot, a leg and a hand contact electrodes is used, and (c) is a diagram illustrating the posture of a body when an activity information meter in which a foot, an arm and a hand contact electrodes is used.
Figure 18B:
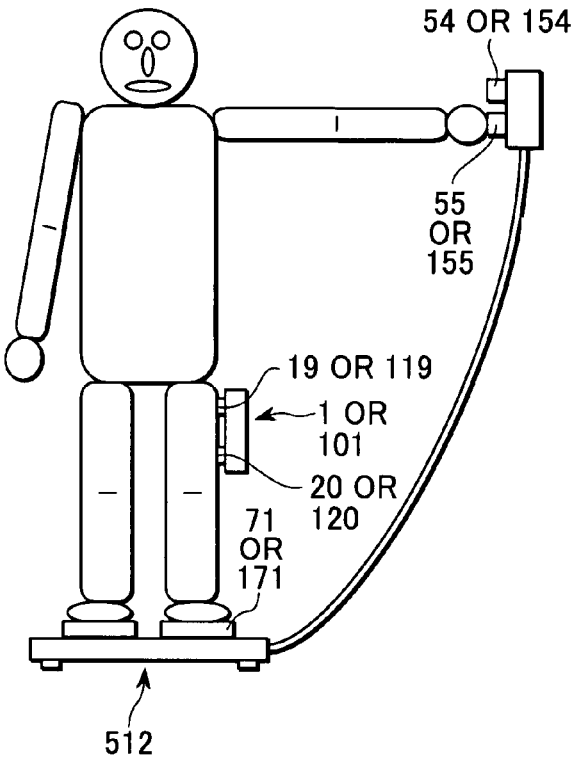
Figure 18C:
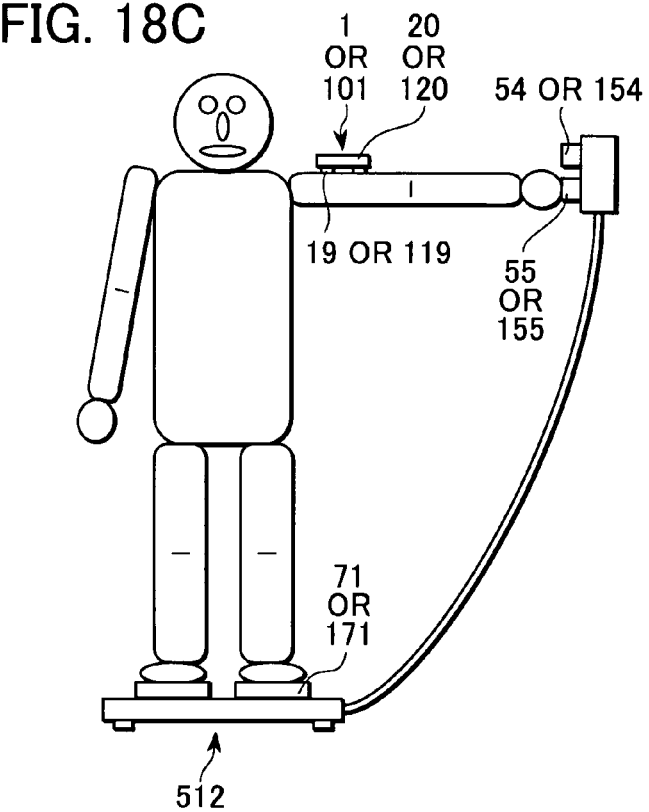

Although data is transmitted with the arm and the hand in contact with the electrodes in the above activity information meter in Example 1 or 2, the activity information meter may adopt such forms as shown in FIG. 18. More specifically, the activity information meter according to the present invention may attach the measuring device 1 or 101 of Example to a leg and use some electrodes of a four-electrode-type body composition meter 511 which incorporates the constituents of the output device 51 or 151 of Example as the third electrode 71 or 171, fourth electrode 54 or 154 and fifth electrode 55 or 155 of Example as shown in FIG. 18(*a*), may attach the measuring device 1 or 101 of Example to a leg and use some electrodes of a six-electrode-type body composition meter 512 which incorporates the constituents of the output device 51 or 151 of Example as the third electrode 71 or 171, fourth electrode 54 or 154 and fifth electrode 55 or 155 of Example as shown in FIG. 18(*b*) or may attach the measuring device 1 or 101 of Example to an arm and use some electrodes of a six-electrode-type body composition meter 512 which incorporates the constituents of the output device 51 or 151 of Example as the third electrode 71 or 171, fourth electrode 54 or 154 and fifth electrode 55 or 155 of Example as shown in FIG. 18(*c*).

Figure 19:
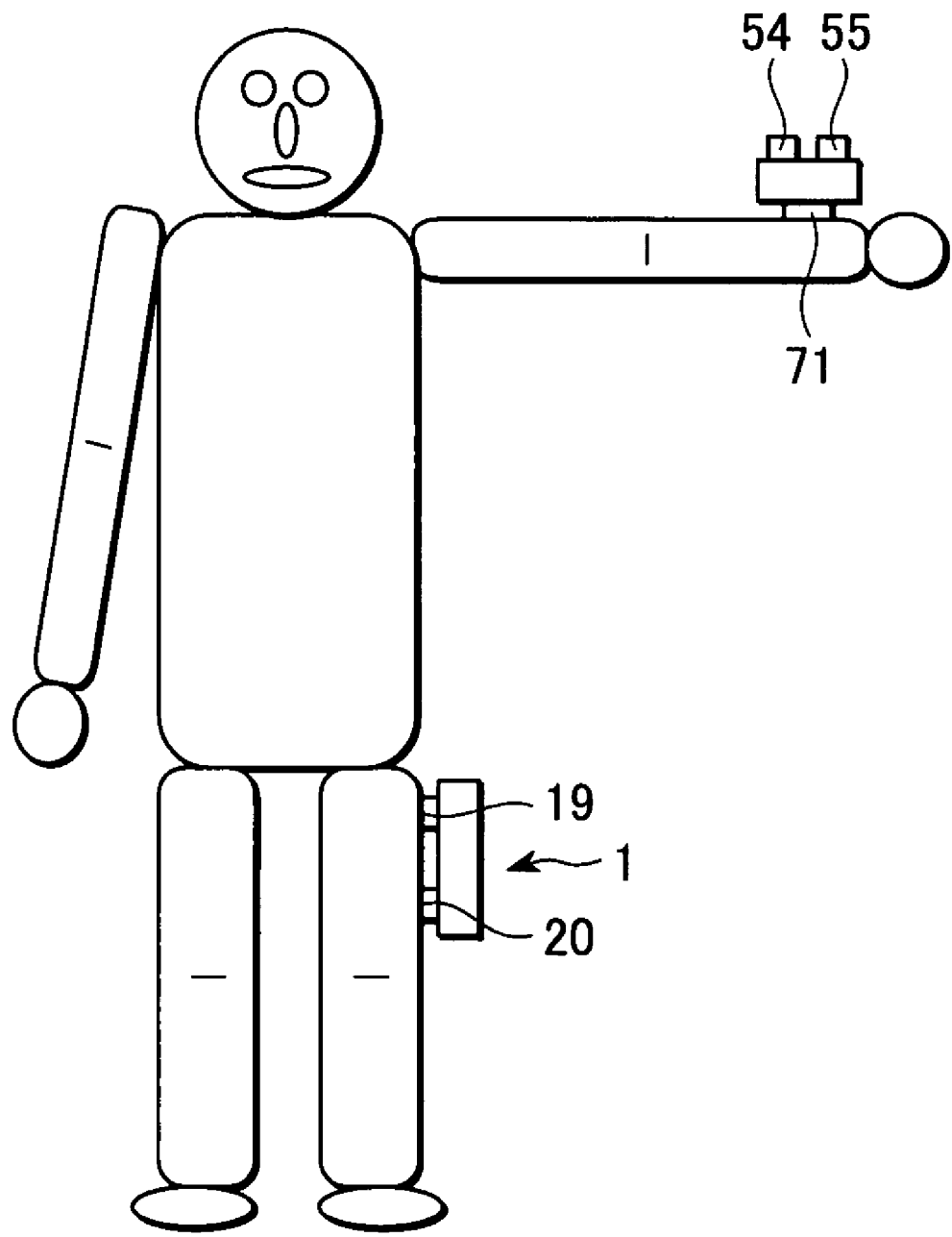
FIG. 19 is a diagram illustrating the posture of a body when an activity information meter in which an arm, a hand and a leg contact electrodes, i.e. a variation of the activity information meter of Example 1, is used.

Further, the above activity information meter shown in FIG. 18 has the third electrode 71 or 171, fourth electrode 54 or 154 and fifth electrode 55 or 155 of Example at one end part and another end part of a body and has the measuring device 1 or 101 of Example in a current path between the one end part and another end part of the body. However, in the case of the above activity information meter of Example 1, it has the third electrode 71 or 171, fourth electrode 54 or 154 and fifth electrode 55 or 155 of Example at one end part and another end part of a body and does not need to have the measuring device 1 or 101 in a current path between the one end part and another end part of the body and may have the measuring device out of a current path between one end part (left wrist) of a body and another end part (right hand) of the body (i.e. on a thigh) as shown in FIG. 19.

Further, although the measuring device 1 or 101 in the above Example 1 or 2 measures a pulse rate and a movement speed as activity information, it is not limited to the data. For example, the measuring device 1 or 101 may measure blood pressure or body temperature as activity information meter.

Further, although the power switch 4 in the above Example 1 or 2 is a slide type, it may be a push type or other type. Further, the pulse sensor 8 which is a piezoelectric type in Example 1 or 2 may be a photoelectric type or other type, and the acceleration sensor 7 which is a semiconductor piezoresistance type in Example 1 or 2 may be a piezoelectric type, capacitance type or other type.

Further, in the above Example 1 or 2, when the band 3 is attached to the left upper arm, the first electrode 19 or 119 and the second electrode 20 or 120 are positioned side by side in the direction of transmission (i.e. longitudinal direction of the arm) L on the arm-contacting surface of the band 3 as shown in FIG. 20(*a*). However, it is more preferable that the electrodes be positioned at opposite sides as shown in FIG. 20(*b*). This is because energization may occur due to sweating or capillaries and disturb transmission. Disturbance of transmission can be prevented more securely when the first electrode 19 or 119 and the second electrode 20 or 120 are positioned at opposite side and with a distance d of at least 10 mm therebetween in the direction of transmission (i.e. longitudinal direction of the arm) L.

Further, in the above description of the operations according to the flows illustrated in FIGS. 9 (9A, 9B and 9C) and 10 (10A and 10B) in Example 1 and the operations according to the flows illustrated in FIGS. 16 (16A, 16B and 16C) and 17 (17A and 17B) in Example 2, the output device 51 or 151 transmits data requesting transmission of measurement data to the measuring device 1 or 101 as control data, the measuring device 1 or 101 transmits the measurement data to the output device 51 or 151 upon receipt of the transmitted data requesting transmission of the measurement data, and the output device 51 or 151 displays the transmitted measurement data on the display section. Alternatively, it is also possible that at the press of the power switch 4, the measuring device 1 or 101 transmits measurement data constantly, and when the subject 500 activates the first switch 58 by touching the fourth electrode 54 or 154 by the right hand or activates the first switch 58 by touching the fifth electrode 55 or 155 by the right hand, the output device 51 or 151 receives the constantly transmitted measurement data and displays the received measurement data on the display section.

What is claimed is:

1. An activity information meter comprising a measuring device and an output device which are formed separately and transmit measurement data and control data via a body as a medium, the measuring device comprising:
a measurement section,
an oscillation section for the measuring device,
a modulation section for the measuring device,
a current output section for the measuring device,
a transmitting/receiving electrode for the measuring device,
a transmitting electrode for the measuring device,
a reference potential section for the measuring device,
a voltage detection section for the measuring device,
a demodulation section for the measuring device,
a first selector,
a second selector,
a sixth selector, and
a control section for the measuring device,
the output device comprising:
an oscillation section for the output device,
a modulation section for the output device,
a current output section for the output device,
a transmitting/receiving electrode for the output device,
a transmitting electrode for the output device, a reference potential section for the output device,
a voltage detection section for the output device,
a demodulation section for the output device,
a third selector,
a fourth selector,
a fifth selector,
a control section for the output device, and
an output section,
wherein
the measurement section measures activity information as measurement data,
the oscillation section for the measuring device generates an alternating current signal,
the modulation section for the measuring device modulates the alternating current signal generated by the oscillation section for the measuring device into a modulated signal based on the measurement data measured by the measurement section,
the current output section for the measuring device outputs a current corresponding to the modulated signal modulated by the modulation section for the measuring device,
the transmitting/receiving electrode for the measuring device contacts a body part between one end part and another end part of a body to pass the current output from the current output section for the measuring device through the body and detect a change in potential which occurs in the body,
the transmitting electrode for the measuring device contacts a body part between the one end part of the body and the transmitting/receiving electrode for the measuring device to pass the current output from the current output section for the measuring device through the body,
the reference potential section for the measuring device has a reference potential,
the voltage detection section for the measuring device detects a voltage based on the reference potential of the reference potential section for the measuring device and the change in potential in the body which has been detected by the transmitting/receiving electrode for the measuring device,
the demodulation section for the measuring device demodulates the voltage detected by the voltage detection section for the measuring device into a demodulated signal,
the first selector selects connection between the current output section for the measuring device and the transmitting/receiving electrode for the measuring device or connection between the current output section for the measuring device and the second selector,
the second selector selects connection between the current output section for the measuring device and the transmitting electrode for the measuring device or connection between the current output section for the measuring device and the first selector,
the sixth selector selects connection between the transmitting electrode for the measuring device and the voltage detection section for the measuring device or connection between the reference potential section for the measuring device and the voltage detection section for the measuring device,
the control section for the measuring device controls the first selector to select connection between the current output section for the measuring device and the second selector, controls the second selector to select connection between the current output section for the measuring device and the first selector and controls the sixth selector to select connection between the reference potential section for the measuring device and the voltage detection section for the measuring device when the measuring device receives control data, while the control section for the measuring device issues the measurement data measured by the measurement section to the modulation section for the measuring device and controls the first selector to select connection between the current output section for the measuring device and the transmitting/receiving electrode for the measuring device, controls the second selector to select connection between the current output section for the measuring device and the transmitting electrode for the measuring device and controls the sixth selector to select connection between the transmitting electrode for the measuring device and the voltage detection section for the measuring device when the measuring device transmits the measurement data,
the oscillation section for the output device generates an alternating current signal,
the modulation section for the output device modulates the alternating current signal generated by the oscillation section for the output device into a modulated signal based on control data,
the current output section for the output device outputs a current corresponding to the modulated signal modulated by the modulation section for the output device,
the transmitting/receiving electrode for the output device contacts one end part of the body to pass the current output from the current output section for the output device through the body and detect a change in potential which occurs in the body,
the transmitting electrode for the output device contacts another end part of the body to pass the current output from the current output section for the output device through the body,
the reference potential section for the output device has a reference potential,
the voltage detection section for the output device detects a voltage based on the reference potential of the reference potential section for the output device and the change in potential in the body which has been detected by the transmitting/receiving electrode for the output device,
the demodulation section for the output device demodulates the voltage detected by the voltage detection section for the output device into a demodulated signal,
the third selector selects connection between the current output section for the output device and the transmitting/receiving electrode for the output device or connection between the current output section for the output device and the fourth selector,
the fourth selector selects connection between the current output section for the output device and the transmitting electrode for the output device or connection between the current output section for the output device and the third selector,
the fifth selector selects connection between the transmitting electrode for the output device and the voltage detection section for the output device or connection between the reference potential section for the output device and the voltage detection section for the output device,
the control section for the output device issues control data to the modulation section for the output device and controls the third selector to select connection between the current output section for the output device and the transmitting/receiving electrode for the measuring device, controls the fourth selector to select connection between the current output section for the output device and the transmitting electrode for the output device and controls the fifth selector to select connection between the transmitting electrode for the output device and the voltage detection section for the output device when the output device transmits the control data, while the control section for the output device controls the third selector to select connection between the current output section for the output device and the fourth selector, controls the fourth selector to select connection between the current output section for the output device and the third selector and controls the fifth selector to select connection between the reference potential section for the output device and the voltage detection section for the output device when the output device receives the measurement data, and the output section outputs measurement data corresponding to the demodulated signal demodulated by the demodulation section for the output device.

2. The activity information meter of claim 1, wherein a start switch which is activated when another end part of the body contacts the transmitting electrode for the output device is provided for each of the transmitting electrodes for the output device, and when transmitting control data, the control section for the output device issues control data corresponding to an activated start switch to the modulation section for the output device, controls the fourth selector to select connection between the current output section for the output device and a transmitting electrode for the output device which corresponds to the activated start switch and controls the fifth selector to select connection between the transmitting electrode for the output device which corresponds to the activated start switch and the voltage detection section for the output device.

3. The activity information meter of claim 2, wherein the transmitting/receiving electrode for the measuring device and the transmitting electrode for the measuring device are placed on the measuring device such that the positional relationship between the transmitting/receiving electrode for the measuring device and the transmitting electrode for the measuring device is reversed when the measuring device is attached to the body.

4. The activity information meter of claim 2, wherein the transmitting/receiving electrode for the measuring device and the transmitting electrode for the measuring device are placed on the measuring device such that the transmitting/receiving electrode for the measuring device and the transmitting electrode for the measuring device are distant from each other by at least 10 mm when the measuring device is attached to the body.

5. The activity information meter of claim 3, wherein the transmitting/receiving electrode for the measuring device and the transmitting electrode for the measuring device are placed on the measuring device such that the transmitting/receiving electrode for the measuring device and the transmitting electrode for the measuring device are distant from each other by at least 10 mm when the measuring device is attached to the body.

6. The activity information meter of claim 1, wherein the transmitting/receiving electrode for the measuring device and the transmitting electrode for the measuring device are placed on the measuring device such that the positional relationship between the transmitting/receiving electrode for the measuring device and the transmitting electrode for the measuring device is reversed when the measuring device is attached to the body.

7. The activity information meter of claim 6, wherein the transmitting/receiving electrode for the measuring device and the transmitting electrode for the measuring device are placed on the measuring device such that the transmitting/receiving electrode for the measuring device and the transmitting electrode for the measuring device are distant from each other by at least 10 mm when the measuring device is attached to the body.

8. The activity information meter of claim 1, wherein the transmitting/receiving electrode for the measuring device and the transmitting electrode for the measuring device are placed on the measuring device such that the transmitting/receiving electrode for the measuring device and the transmitting electrode for the measuring device are distant from each other by at least 10 mm when the measuring device is attached to the body.

9. An activity information meter comprising a measuring device and an output device which are formed separately and transmit measurement data and control data via a body as a medium, the measuring device comprising:
a measurement section,
an oscillation section for the measuring device,
a modulation section for the measuring device,
a current output section for the measuring device,
a first transmitting/receiving electrode for the measuring device,
a second transmitting/receiving electrode for the measuring device,
a voltage detection section for the measuring device,
a demodulation section for the measuring device,
a first selector,
a second selector, and
a control section for the measuring device,
the output device comprising:
an oscillation section for the output device,
a modulation section for the output device,
a current output section for the output device,
a first transmitting/receiving electrode for the output device,
a second transmitting/receiving electrode for the output device,
a voltage detection section for the output device,
a demodulation section for the output device,
a third selector,
a fourth selector,
a fifth selector,
a sixth selector,
a control section for the output device, and
an output section,
wherein
the measurement section measures activity information as measurement data,
the oscillation section for the measuring device generates an alternating current signal,
the modulation section for the measuring device modulates the alternating current signal generated by the oscillation section for the measuring device into a modulated signal based on the measurement data measured by the measurement section,
the current output section for the measuring device outputs a current corresponding to the modulated signal modulated by the modulation section for the measuring device, the first transmitting/receiving electrode for the measuring device contacts a body part between one end part and another end part of a body to pass the current output from the current output section for the measuring device through the body and detect a potential which occurs in the body part, the second transmitting/receiving electrode for the measuring device contacts a body part between the one end part of the body and the first transmitting/receiving electrode for the measuring device to pass the current output from the current output section for the measuring device through the body and detect a potential which occurs in the body part, the voltage detection section for the measuring device detects a voltage based on the potential in the body part which has been detected by the first transmitting/receiving electrode for the measuring device and the potential in the body part which has been detected by the second transmitting/receiving electrode for the measuring device, the demodulation section for the measuring device demodulates the voltage detected by the voltage detection section for the measuring device into a demodulated signal, the first selector selects connection between the current output section for the measuring device and the first transmitting/receiving electrode for the measuring device or connection between the current output section for the measuring device and the second selector, the second selector selects connection between the current output section for the measuring device and the second transmitting/receiving electrode for the measuring device or connection between the current output section for the measuring device and the first selector, the control section for the measuring device controls the first selector to select connection between the current output section for the measuring device and the second selector and controls the second selector to select connection between the current output section for the measuring device and the first selector when the measuring device receives control data, while the control section for the measuring device issues the measurement data measured by the measurement section to the modulation section for the measuring device and controls the first selector to select connection between the current output section for the measuring device and the first transmitting/receiving electrode for the measuring device and controls the second selector to select connection between the current output section for the measuring device and the second transmitting/receiving electrode for the measuring device when the measuring device transmits the measurement data, the oscillation section for the output device generates an alternating current signal, the modulation section for the output device modulates the alternating current signal generated by the oscillation section for the output device into a modulated signal based on control data, the current output section for the output device outputs a current corresponding to the modulated signal modulated by the modulation section for the output device, the first transmitting/receiving electrode for the output device contacts one end part of the body to pass the current output from the current output section for the output device through the body and detect a potential which occurs in the body part, the second transmitting/receiving electrode for the output device contacts another end part of the body to pass the current output from the current output section for the output device through the body and detect a potential which occurs in the body part, the voltage detection section for the output device detects a voltage based on the potential in the body part which has been detected by the first transmitting/receiving electrode for the output device and the potential in the body part which has been detected by the second transmitting/receiving electrode for the output device, the demodulation section for the output device demodulates the voltage detected by the voltage detection section for the output device into a demodulated signal, the third selector selects connection between the current output section for the output device and the first transmitting/receiving electrode for the output device or connection between the current output section for the output device and the fourth selector, the fourth selector selects connection between the current output section for the output device and the second transmitting/receiving electrode for the output device or connection between the current output section for the output device and the third selector, the fifth selector selects connection between the first transmitting/receiving electrode for the output device and the voltage detection section for the output device or connection between the voltage detection section for the output device and the sixth selector, the sixth selector selects connection between the second transmitting/receiving electrode for the output device and the voltage detection section for the output device or connection between the voltage detection section for the output device and the fifth selector, the control section for the output device issues control data to the modulation section for the output device and controls the third selector to select connection between the current output section for the output device and the first transmitting/receiving electrode for the output device, controls the fourth selector to select connection between the current output section for the output device and the second transmitting/receiving electrode for the output device, controls the fifth selector to select connection between the first transmitting/receiving electrode for the output device and the voltage detection section for the output device and controls the sixth selector to select connection between the second transmitting/receiving electrode for the output device and the voltage detection section for the output device when the output device transmits the control data, while the control section for the output device controls the third selector to select connection between the current output section for the output device and the fourth selector, controls the fourth selector to select connection between the current output section for the output device and the third selector, controls the fifth selector to select connection between the first transmitting/receiving electrode for the output device and the voltage detection section for the output device and controls the sixth selector to select connection between the second transmitting/receiving electrode for the output device and the voltage detection section for the output device when the output device receives measurement data, and the output section outputs measurement data corresponding to the demodulated signal demodulated by the demodulation section for the output device.

10. The activity information meter of claim 9, wherein a start switch which is activated when another end part of the body contacts the second transmitting/receiving electrode for the output device is provided for each of the second transmitting/receiving electrodes for the output device, and when transmitting control data, the control section for the output device issues control data corresponding to an activated start switch to the modulation section for the output device, controls the fourth selector to select connection between the current output section for the output device and a second transmitting/receiving electrode for the output device which corresponds to the activated start switch and controls the sixth selector to select connection between the second transmitting/receiving electrode for the output device which corresponds to the activated start switch and the voltage detection section for the output device, while when receiving measurement data, the control section for the output device controls the fourth selector to select connection between the current output section for the output device and the third selector and controls the sixth selector to select connection between the second transmitting/receiving electrode for the output device which corresponds to the activated start switch and the voltage detection section for the output device.

11. The activity information meter of claim 10, wherein the first transmitting/receiving electrode for the measuring device and the second transmitting/receiving electrode for the measuring device are placed on the measuring device such that the positional relationship between the first transmitting/receiving electrode for the measuring device and the second transmitting/receiving electrode for the measuring device is reversed when the measuring device is attached to the body.

12. The activity information meter of claim 10, wherein the first transmitting/receiving electrode for the measuring device and the second transmitting/receiving electrode for the measuring device are placed on the measuring device such that the first transmitting/receiving electrode for the measuring device and the second transmitting/receiving electrode for the measuring device are distant from each other by at least 10 mm when the measuring device is attached to the body.

13. The activity information meter of claim 11, wherein the first transmitting/receiving electrode for the measuring device and the second transmitting/receiving electrode for the measuring device are placed on the measuring device such that the first transmitting/receiving electrode for the measuring device and the second transmitting/receiving electrode for the measuring device are distant from each other by at least 10 mm when the measuring device is attached to the body.

14. The activity information meter of claim 9, wherein the first transmitting/receiving electrode for the measuring device and the second transmitting/receiving electrode for the measuring device are placed on the measuring device such that the positional relationship between the first transmitting/receiving electrode for the measuring device and the second transmitting/receiving electrode for the measuring device is reversed when the measuring device is attached to the body.

15. The activity information meter of claim 14, wherein the first transmitting/receiving electrode for the measuring device and the second transmitting/receiving electrode for the measuring device are placed on the measuring device such that the first transmitting/receiving electrode for the measuring device and the second transmitting/receiving electrode for the measuring device are distant from each other by at least 10 mm when the measuring device is attached to the body.

16. The activity information meter of claim 9, wherein the first transmitting/receiving electrode for the measuring device and the second transmitting/receiving electrode for the measuring device are placed on the measuring device such that the first transmitting/receiving electrode for the measuring device and the second transmitting/receiving electrode for the measuring device are distant from each other by at least 10 mm when the measuring device is attached to the body.

* * * * *